US012291193B1

(12) United States Patent
Qian et al.

(10) Patent No.: US 12,291,193 B1
(45) Date of Patent: May 6, 2025

(54) TRAJECTORY DETERMINATION BASED ON HEURISTIC GRID DATA

(71) Applicant: Zoox, Inc., Foster City, CA (US)

(72) Inventors: Steven Cheng Qian, San Francisco, CA (US); Zheyuan Xie, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 169 days.

(21) Appl. No.: 18/113,149

(22) Filed: Feb. 23, 2023

(51) Int. Cl.
  *B60W 30/06* (2006.01)
  *B60W 50/00* (2006.01)
  *G01C 21/34* (2006.01)

(52) U.S. Cl.
  CPC ............ *B60W 30/06* (2013.01); *B60W 50/00* (2013.01); *G01C 21/3453* (2013.01); *B60W 2050/0022* (2013.01)

(58) Field of Classification Search
  CPC ............... B60W 30/06; B60W 50/00; B60W 2050/0022; G01C 21/3453
  USPC ............................................................. 701/24
  See application file for complete search history.

(56) References Cited

U.S. PATENT DOCUMENTS

| 10,649,459 | B2 | 5/2020 | Wang |
| 11,077,878 | B2* | 8/2021 | Hudecek .............. G05D 1/0217 |
| 2016/0223350 | A1* | 8/2016 | Lewis .................. G07C 5/0841 |
| 2017/0010618 | A1* | 1/2017 | Shashua ............... G05D 1/0246 |
| 2019/0287407 | A1* | 9/2019 | Branscombe .......... G08G 1/161 |
| 2021/0192777 | A1* | 6/2021 | Wan ....................... G06F 18/22 |
| 2022/0043446 | A1* | 2/2022 | Ding ..................... G05D 1/0214 |
| 2022/0082403 | A1* | 3/2022 | Shapira .................. G06V 20/58 |
| 2024/0174256 | A1* | 5/2024 | Narayanan .......... B60W 60/001 |

FOREIGN PATENT DOCUMENTS

| DE | 102015208123 A1 * | 10/2016 | ......... B62D 15/0285 |
| DE | 102017116239 A1 * | 1/2019 | ........... B62D 15/027 |
| EP | 3663718 B1 * | 3/2022 | ............. G01C 21/30 |

OTHER PUBLICATIONS

Werling, Moritz. "Integrated Trajectory Optimization." Handbook of Driver Assistance Systems. Cham: Springer International Publishing. 1413-1435. 2015, Web. (Year: 2015).*
Kälin, Ursula et al. "Highly Accurate Pose Estimation as a Reference for Autonomous Vehicles in Near-Range Scenarios." Remote sensing 14.1 (2022): 90-. Web. (Year: 2022).*

(Continued)

*Primary Examiner* — Russell Frejd
*Assistant Examiner* — Keith A von Volkenburg
(74) *Attorney, Agent, or Firm* — Lee & Hayes, P.C.

(57) ABSTRACT

Techniques for determining a parking trajectory for a vehicle are discussed herein. A parking management component may determine or receive a three-dimensional grid ("grid"), discretized based at least in part on a heading offset, a lateral offset, and/or a longitudinal offset between a first and second pose. A cell of the grid may include a cost associated indicating a minimum difference to the second pose when moving from the first as may be limited based on kinematic and/or dynamic constraints. When driving, a vehicle may determine a relative state of the vehicle to a desired location, use the relative state to access a cost from the grid, and determine whether to follow a trajectory based on the cost.

20 Claims, 9 Drawing Sheets

(56) References Cited

OTHER PUBLICATIONS

Werling, Moritz. "Integrated Trajectory Optimization." Handbook of Driver Assistance Systems. Cham: Springer International Publishing. 1413-1435. Web. (Year: 2015).*
Gu, Tianyu. "Improved Trajectory Planning for On-Road Self-Driving Vehicles Via Combined Graph Search, Optimization & Topology Analysis." ProQuest Dissertations & Theses, 2017. Print. (Year: 2017).*
U.S. Appl. No. 18/072,015, filed Nov. 30, 2022, Narayanan, et al., "Vehicle Trajectory Tree Search for Off-Route Driving Maneuvers", 66 pages.

* cited by examiner

TRAJECTORY DETERMINATION BASED ON HEURISTIC GRID DATA

BACKGROUND

An autonomous vehicle may navigate along designated routes or between waypoints. For example, when a control system receives a request from a user device to pick up a passenger or cargo at a location and provide transport to a destination location, the autonomous vehicle may receive, from the control system, instructions to navigate from the pickup location to the destination location. In some circumstances, the autonomous vehicle may be required to park in order to pick the passenger or cargo up at the pickup location or drop off the passenger or cargo at the destination location. In some instances, such as when the area of the pickup location and/or destination location includes parking spaces, the vehicle may determine which of the generated trajectories to follow to a parking space. However, in many cases, techniques for parking trajectory selection may be suboptimal and can result in excessive computations and/or delayed results, making these techniques unsuitable for real-time computation.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
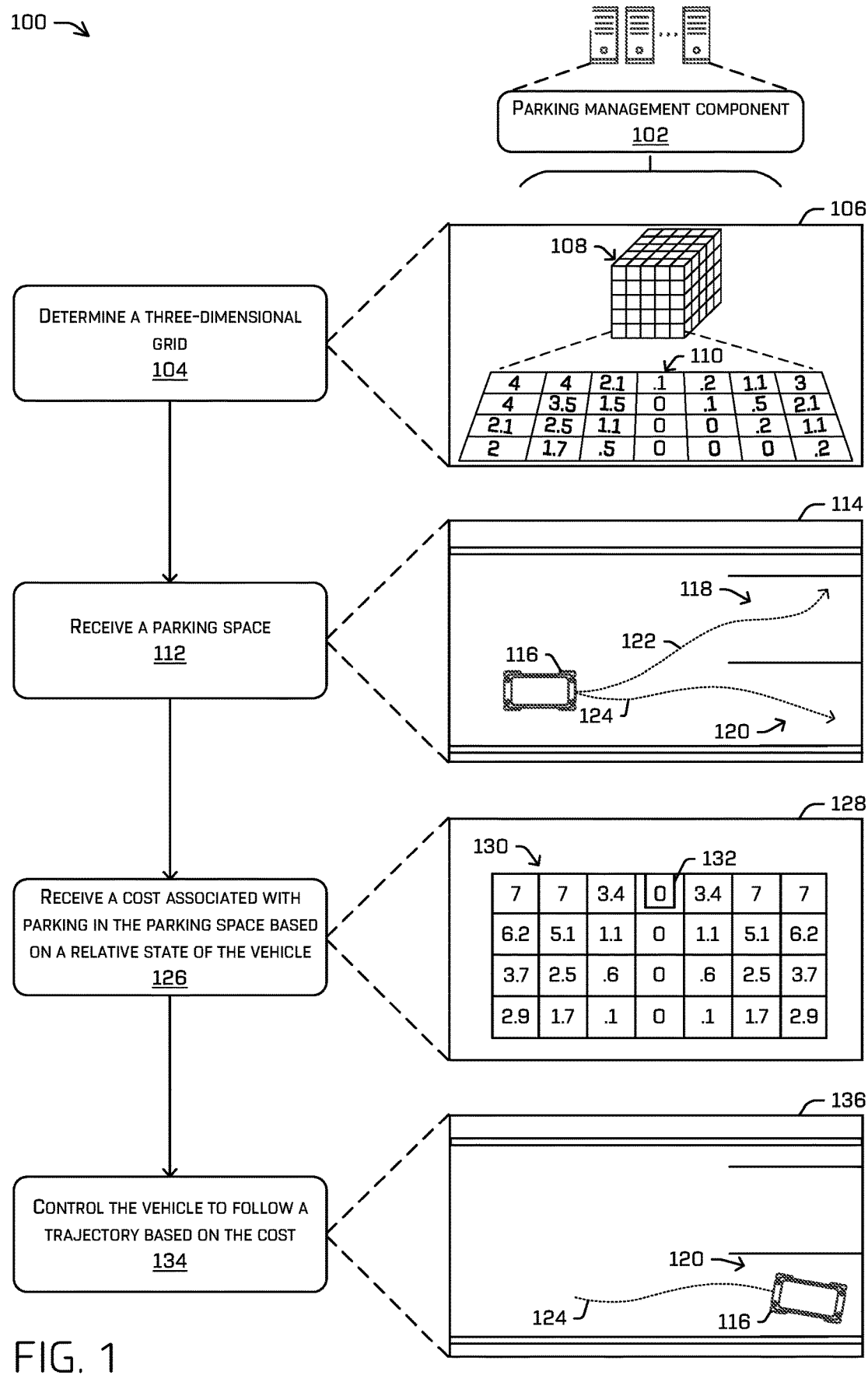
FIG. 1 is a pictorial flow diagram illustrating an example technique for determining a parking trajectory based on a three-dimensional grid and the parking costs found therein, in accordance with one or more examples of the disclosure.

As discussed above, determining parking trajectories while a vehicle navigates an environment may be computationally expensive. For example, a vehicle may determine parking costs for each generated parking trajectory, resulting in excessive computations and delayed results, making such techniques unsuitable for real-time computation.

Techniques for determining a parking trajectory for a vehicle are discussed herein. As described herein, a three-dimensional grid containing parking costs may be determined during a pre-computation stage to enable a vehicle to receive parking costs associated with a relative state of the vehicle while navigating an environment. In some examples, a parking management component may determine, receive, or otherwise generate a three-dimensional grid. The three-dimensional grid may include multiple layers associated with relative heading angles of a vehicle. Further, a layer may include cells at various longitudinal and lateral offsets. A cell may include a parking cost associated with parking in a parking spot based on the relative state of the vehicle with respect to the parking space.

In some examples, a vehicle (such as an autonomous vehicle) may be instructed to navigate to a destination (e.g., pickup location, drop off location, delivery location, service location) within the environment. Upon determining that the vehicle is within a threshold distance from the destination, the vehicle may receive and/or identify one or more parking spaces proximate the destination. In some examples, the vehicle may generate one or more trajectories for the vehicle to follow to the parking spaces. In order to determine which trajectory to follow, the vehicle may determine a parking cost associated with the trajectory. In such instances, as a trajectory includes multiple states (e.g., includes state information of the vehicle at a position along the trajectory), the vehicle may determine a parking cost associated with each state along the trajectory based on the vehicle determining a relative state of the vehicle (e.g., for each state) and using the relative state(s) to access the three-dimensional grid. The vehicle may receive a parking cost from the three-dimensional grid associated with the state. The vehicle may determine the trajectory parking cost by aggregating the parking costs associated with each state along the trajectory. The vehicle may select or otherwise determine to follow the trajectory based at least in part on the parking cost (e.g., other costs may be associated with the action and evaluated as well including, for example, safety, comfort, etc.). As discussed throughout this disclosure, the techniques described herein may improve vehicle safety, driving efficiency, and parking efficiency by determining and/or using a three-dimensional grid containing parking costs to efficiently allow a vehicle to query the grid for parking costs while navigating the environment, thereby enabling the computing systems of the vehicle (e.g., parking management component, planning component, etc.) to perform safer and more efficient driving maneuvers.

When determining a trajectory to follow during a parking maneuver, conventional techniques may result in suboptimal and/or delayed results. For example, a vehicle may receive multiple parking spaces proximate a driving destination. In such instances, the vehicle may generate multiple (e.g., 10, 20, 100, etc.) candidate trajectories leading to each of the parking spaces. The vehicle may generate, while navigating to the parking spaces, a parking cost for each candidate trajectory. Determining such cost values may be computationally expensive, especially when the number of trajectories is large and/or the kinematics/dynamics associated with performing the technique is complex. Further, as some trajectories are similar to one another, generating parking costs for each trajectory may be computationally inefficient. In addition, the parking costs may be inaccurate based on the time horizon of the generated trajectory. For example, a vehicle may generate a trajectory that instructs the vehicle's movement for a period of time (e.g., 6 seconds, 8 seconds, 10 seconds, etc.). When determining a cost for such trajectories, a vehicle may compare a final state of the trajectory with a target state of the parking space. However, in an effort to reduce memory consumption, a vehicle may change the time horizon of the trajectory to a shorter period of time. In such instances, a shorter time horizon may cause the final state of the vehicle to be located outside of the parking space. As such, causing parking costs to be dependent on a trajectory time horizon may lead to inaccurate or delayed results. Consequently, performing such cost determining techniques may result in processing delays and errors in controlling the vehicle.

To address these and other technical problems and inefficiencies, the systems and/or techniques described herein include a parking management system (which also may be referred to as a "parking management component" or "parking component") configured to determine or otherwise select a trajectory to follow based on a parking cost. Further, the parking management component may determine a three-dimensional grid (or "grid") containing one or more parking costs given a relative state of a vehicle, and leverage the grid to determine, in real time, a parking cost associated with following a trajectory to a parking space. Technical solutions discussed herein solve one or more technical problems associated with conventional parking trajectory selection techniques resulting in processing delays, excessive amounts of required computational resources, and/or inaccurate vehicle actions.

Initially, a parking management component may generate, receive, or otherwise determine a grid. The parking management component may determine the grid during a pre-computation stage and/or by a remote server-based system. For example, a pre-computation stage may be a moment in which the vehicle turns on, initializes, and/or any other situation. In some examples, the grid may be a heuristic-based grid containing parking costs (e.g., within each cell) indicating the efficacy of parking in a parking space based on a relative state of a vehicle. The grid may include multiple layers, each layer may include multiple cells, each cell may include a value (e.g., parking cost) indicating a lower bound parking cost. The grid may include dimensions such as a z-axis (e.g., layers) corresponding to a heading angle (e.g., a relative heading offset between the vehicle and a target heading associated with a parking space), an x-axis corresponding to a longitudinal offset, and a y-axis corresponding to a lateral offset. The longitudinal and lateral offsets may be relative to a specific region of the layer (e.g., parking space, cell, etc.). As a non-limiting example, the grid may be associated with a costs corresponding to a range of longitudinal distances from a current position to a target position, lateral distances from the current position to the target position, and headings between a current heading and a target heading.

In some examples, the parking management component may determine one or more layers of the grid. A layer of the grid may correspond to a heading of a vehicle. In some examples, the parking management component may determine any number of layers at any heading angle. The parking management component may determine layers of any dimension and/or size (e.g., 20×40 meters, 20×20 meters, 100×100 meters, etc.). In some examples, the layer may be positioned and/or disposed in association with a parking space. For example, the parking space may be integrated into and/or overlayed along a center portion of a side of the layer. In some instances, the parking space may include a target pose which may represent an optimal position and orientation (two- or three-dimensional heading) of a vehicle within the parking space. The target position may include a target lateral offset (e.g., y-axis) and a target longitudinal offset (e.g., x-axis) of the vehicle.

In some examples, the parking management system may determine multiple cells within a layer. In some instances, the parking management component may discretize the layer into one or more cells. The parking management system may determine any number of cells having any dimension and/or size (e.g., 1×1 cm, 1×1 meter, 5×5 meters, etc.). The parking management component may generate or otherwise determine the cells with reference to a target parking space being the origin (e.g., lateral and longitudinal offsets are zero (e.g., (0, 0)) with a heading angle of 0 degrees). As such, the location of each cell may be associated with an x-y coordinate (e.g., longitudinal offset and lateral offset) or a range of x-y coordinates. In some examples, the cells may contain a value indicating a parking cost representing the efficacy of parking in the parking space based on the associated heading and relative position (e.g., cell) of the vehicle. In various examples, such values may be interpolated (e.g., using bilinear, trilinear, cubic, etc. interpolations) such that a more accurate cost value is used in assessing the various trajectories having states (e.g., headings, velocities, positions, accelerations, etc.) which don't align with values within the grid.

In some examples, the parking management component may determine a parking cost for a cell. For example, the parking management component may determine a lower bound parking cost for each cell. The parking cost may be based on one or more factors, such as whether a trajectory can be generated from the cell location (e.g., relative state) to the parking space (e.g., at the origin of the layer) based at least in part on kinematics and/or dynamic limitations of the vehicle and/or the closest the vehicle could come to having the desired pose following an optimal trajectory constrained by kinematics/dynamics of the vehicle (in such case, the cost comprising a combination of one or more of a lateral error (e.g., a lateral distance from a preferred/target lateral position within the parking space), a longitudinal error, and/or a heading error (e.g., a difference between a preferred/target heading and a heading of the vehicle along the trajectory)). In some instances, the combination of the factors may be a weighted sum. For example, the parking management component may attempt to generate a trajectory from the cell to the parking space. If the trajectory is successfully generated, the parking management component may determine a lateral error and heading error relative to the final intended parking space associated with the trajectory.

In some cases, the parking management component may identify a parking state (e.g., representation of the state of the vehicle within the parking space) for the trajectory. In those instances in which there are multiple parking spaces, the techniques described herein may be utilized in evaluating a trajectory to any number of the multiple parking spaces. Based on identifying the parking state, the parking management component may determine a lateral error and/or a heading error. The lateral and heading errors may be a measurement that indicates how closely aligned the predicted lateral offset and heading offset of the vehicle at the parking state is with the target lateral offset and target heading offset of the parking space. In such instances, the closer the values of the predicted pose to the values of the target pose, the lower the error values will be. As such, the parking management component may determine the lateral error by comparing the vehicle's predicted lateral offset to the target lateral offset. The parking management component may determine a heading error by comparing the vehicle's predicted heading angle to the target heading angle. In such instances, the parking management component may determine the parking cost by combining (e.g., using mathematical operations) the result of the attempt to generate a trajectory, the lateral error, and/or the heading error. For instances in which a trajectory was not capable of being generated, the parking management component may determine an elevated parking cost. However, this is not intended to be limiting, in other examples the parking cost may also be based on a longitudinal error.

In some examples, the parking management component may determine a single parking cost associated with a region around the parking space. In some instances, when a vehicle is within a threshold distance to the parking space, trajectory generating techniques may be insufficient and/or suboptimal. As such, cost values for such locations may be inaccurately high. Thus, the parking management component may determine a region surrounding the parking space. The parking management component may determine a region of any dimension and/or size (e.g., 2-meter buffer around the parking space, 5-meter buffer around the parking space, etc.). The parking management component may determine a parking cost for instances in which a vehicle is located therein. The region parking cost may be determined based on predicting that the vehicle corrects its heading with a constant curvature angle until reaching the target longitudinally. As such, if a vehicle is located within the region, the parking management system may receive the parking cost of the region, whereas if the vehicle is located outside the region the parking management component may receive a parking cost from cells of the grid.

In some examples, the parking management component may receive a request and/or instructions to navigate to a destination. Such requests may include transporting pedestrians and/or customers between pickup and drop off locations, in addition to delivering goods and/or services to regions of the environment.

In some examples, the parking management component may receive one or more candidate parking spaces for the vehicle based on being within a threshold distance from the destination. The parking management component may receive a set of parking locations (e.g., parking spaces, parking garages, parking lots, etc.) proximate the destination. In addition to receiving the set of parking spaces and the associated locations of such parking spaces, the parking manager may also receive target poses associated with the parking spaces. A target pose may represent an optimal position and orientation (two- or three-dimensional heading) of a vehicle within the parking space. The target position may include a target lateral offset (e.g., y-axis) coordinate and a target longitudinal offset (e.g., x-axis) coordinate of the vehicle.

In some examples, the parking management component may generate a candidate trajectory for the vehicle to follow to a parking space. Upon receiving the set of potential parking spaces, the parking management component may generate one or more candidate trajectories to some or all parking spaces. In some examples, the candidate trajectories may include numerous predicted states that represent the state information of the vehicle at a specific location along the candidate trajectory. For example, a candidate trajectory may have a number of states that represent what the state of a vehicle may be at a specific moment along the trajectory. State information may include location data, pose data (e.g., lateral offset data, longitudinal offset data, heading offset data), velocity data, acceleration data, and/or other elements. As described in more detail below, in order to determine which of the candidate trajectories to follow, the parking management component may receive and/or associate a parking cost with a trajectory based on accessing the grid for any number of the states (including all) and/or determine an aggregate cost based on a sum (including a weighted sum based at least in part on a time or distance from a current time or position) of all costs over the states.

In some instances, the parking management component may determine a pose of the vehicle. In order to access the grid and receive a parking cost associated with the relative state of the vehicle along the trajectory, the parking management component may determine a relative state of the vehicle with respect to the parking space. For example, the parking management component may determine a current pose (e.g., heading, latitude, longitude) of the vehicle at some or all states along the trajectory. Further, the parking management component may determine a relative state of the vehicle by comparing the current pose of the vehicle at the specific state with the target pose of the parking space. As there may be multiple candidate trajectories leading to multiple candidate parking spaces, in order to determine the cost for trajectories leading to different parking spaces, the parking management component may determine relative states of the vehicle at some or all states of each trajectory leading to some or all of the candidate parking spaces. The parking management component may use the one or more relative states to access the grid and receive one or more parking costs associated with the relative state. Such parking costs may be aggregated to determine a parking cost to be associated with the trajectories leading to such parking spaces.

In some examples, the parking management component may access a layer of the grid. As described above, layers of the grid may be arranged and/or organized by heading angle. As such, the parking management component may identify which layer of the grid to access based on a relative heading angle of the vehicle.

In some examples, the parking management component may receive a parking cost from a cell within the layer. Based on identifying the layer corresponding to the relative heading of the vehicle, the parking management component may utilize the relative lateral and longitudinal offsets of the vehicle to determine a cell associated with the relative position of the vehicle. For example, the parking management component may determine the cell that the vehicle is located within by comparing the relative longitudinal and lateral offset values with the x-y coordinates of the cells within the layer. In some examples, the parking management component may determine if the vehicle is located within or outside of the region surrounding the parking space. If the vehicle is located with the region, the parking management component may receive the parking cost associated with the region. Conversely, if the vehicle is located outside of the region, the parking management component may receive the parking cost found within the cell within which the vehicle is located.

In some examples, the parking management component may determine a parking cost associated with the trajectory. As described above, the parking cost within a cell may be the cost for the vehicle to park in a parking space from the relative state. As a trajectory may have one or more states, the parking management component may determine a parking cost for some or all states of the trajectory. Upon identifying the parking cost for each state of the trajectory, the parking management component may add the parking costs of each state to determine a single parking cost that is to be associated with the trajectory. Additional details for determining a parking cost for a relative state of a vehicle and/or a trajectory leading to parking space are described with respect to FIGS. 2 and 5B, as well as throughout the disclosure.

In some examples, the parking management component may associate the parking cost with the one or more candidate trajectories that lead to the particular parking space. The parking management component may identify the candidate trajectories that lead to the parking space and associate the parking cost with such candidate trajectories.

In some examples, the parking management component may select or otherwise determine a trajectory to follow to the parking space. In some examples, the parking management component may select or otherwise determine a trajectory to follow to the parking space based on a sum (e.g., weighted based on how far in time the cost is from a current time) of one or more costs (e.g., parking cost, comfort cost, safety cost, etc.). In such instances, the parking management component may select the trajectory with the lowest overall cost. The parking management component may determine which candidate trajectory to follow based on inputting the parking cost into a tree search. In such a tree search, trajectories may be selected and/or optimized based on associated costs, including all costs to arrive at a node along the tree (e.g., cost-to-come) and a cost to arrive at a final destination from the node (e.g., cost-to-go). In such examples, the parking cost may be associated with and infinite time horizon such that it is correctly accounted for in any cost-to-go optimizations. Techniques for generating a trajectory based at least in part on a tree search may be found, for example, in U.S. patent application Ser. No. 18/072,015 entitled "Vehicle Trajectory Tree Search for Off-Route Driving Maneuvers" filed on Nov. 30, 2022, the entire contents of which are hereby incorporated by reference herein for all purposes.

In some examples, the parking management component may cause the vehicle to traverse to the parking space based on the trajectory. Upon determining the candidate trajectory from the tree search, the vehicle may follow the trajectory to the parking space. Further, the trajectory may cause the vehicle to park within the parking space.

The techniques described herein can improve the functioning, safety, and efficiency of the autonomous and semi-autonomous vehicles operating in various driving environments by using a three-dimensional heuristic grid containing parking costs to efficiently allow a vehicle to query the grid for parking costs while navigating the environment. Determining the three-dimensional grid in a pre-computation stage as described herein may improve computational efficiency by reducing the amount of processing for the vehicle to perform in order to receive and/or determine a parking cost. The improved computation efficiency can increase computing speeds which may enable the vehicle to receive parking costs sooner, thereby enabling the vehicle to determine vehicle trajectories sooner.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or robotic platform), and are not limited to autonomous vehicles. In one example, similar techniques may be utilized in driver-controlled vehicles in which such a system may assume control of the vehicle to park the vehicle or provide an indication of whether it is safe to perform various maneuvers. In other examples, any or all of the techniques described herein may be implemented in other machine vison systems, such as security systems, object inspection and/or quality assurance systems, environment monitoring systems, etc. Moreover, even though the vehicles described herein are depicted as land vehicles, in other examples such vehicles may be aircraft, spacecraft, watercraft, and/or the like. Additionally, the techniques described herein may be used with real data (e.g., captured using sensor(s)), simulated data (e.g., generated by a simulator), or any combination of the two.

FIG. 1 is a pictorial flow diagram illustrating an example process 100 for determining a parking trajectory based on a three-dimensional grid and the parking costs found therein. As shown in this example, some or all of the operations in the example process 100 may be performed by a parking management component integrated within a perception component, a prediction component, a planning component, and/or other components and systems within an autonomous vehicle. For instance, as shown in this example, example process 100 may be implemented using a parking management component 102. As described below in more detail, the parking management component 102 may include various components, such as a grid generating component, a relative state component, a cost identifying component, and/or a trajectory determining component, which may be configured to determine a grid, receive candidate parking spaces, determine parking costs based on the grid, and/or control the vehicle based on determining the candidate trajectory to follow. Additionally, or alternatively, the parking management component 102 may be integrated in a separate server-based system.

At operation 104, the parking management component 102 may determine or otherwise receive a three-dimensional grid. In some examples, the parking management component 102 may determine a three-dimensional grid that may include one or more layers, one or more cells within the layer(s), and/or a parking cost within each cell. For example, box 106 illustrates a grid 108 and a layer 110 associated therein. In this example, the grid 108 may include five layers, although any number of layers may be included in the grid 108. However, this is not intended to be limiting, in other examples, the grid 108 may have more or less layers. In some cases, the grid may have multiple dimensions and is not limited to three. For example, the grid can include dimensions based on vehicle velocity, vehicle occupancy, time of day, based on weather, vehicle component status, and the like. Further, the grid 108 as shown in box 106 may be shaped as a square; however, in other examples the grid 108 may be rectangularly shaped, or any other shape.

As shown in box 106, the grid 108 may include a layer 110 that is enlarged for illustrative purposes. In some examples, the parking management component 102 may determine the layers to be associated with a heading angle. For example, each of the layers within the grid 108 may be associated with a different heading angle. The heading angle may be with respect to a parking space (not shown) which is designated as the origin (e.g., (0, 0) with 0 degree heading angle). The parking space may be positioned and/or over-layed along a center portion of a side of the layer. In this example, the parking space (e.g., origin) may be located in the center of the top edge of the layer 110. In this instance, the heading angle of the layer 110 may be 45 degrees. The parking management component 102 may generate or otherwise determine layers between the heading angles of −90 to 90 degrees (e.g., −pi/2 to pi/2). In such instances, the parking management component 102 may determine a layer for every degree; however, in other examples the parking management component 102 may determine more or less layers per heading angle (e.g., linearly, non-linearly, etc.).

In this example, the parking management component may determine cells within the layer 110. In this example, the layer 110 may include multiple cells which may include parking cost values. As shown in box 106, the layer 110 may include seven columns and four rows of cells; however, in other examples the parking management component 102 may determine more or less cells with the layer 110. In this example, the cells within the layer 110 are square shaped; however, in other examples the cells may be rectangular (or any regular or irregular shape). The parking management component 102 may determine cells with any resolution level. For example, the parking management component 102 may determine cells with any dimension and/or size (e.g., 1×1 cm, 1×1 meter, 5×5 meter, etc.). Additionally, the parking management component 102 may determine cells of different sizes within the same layer 110. The cells within the layer 110 may be associated with an x-y coordinate or a range of x-y coordinates. Further, some or all cells may include unique cell identifiers which may further be associated with a parking cost located therein. For example, and as shown in box 106, a cell may include a parking cost representing the efficacy of parking in the parking space based on the associated heading and relative position (e.g., cell) of the vehicle. As such, the cell identifiers may be mapped to a parking cost located therein.

As illustrated in box 106, the parking management component 102 may determine a lower bound parking cost for the cells located within the layer 110. In this example, the cells within the layer 110 include values that range from 0-4; however, in other examples the values can extend above and below this range. Cells that have higher values represent the difficulty and/or inaccuracy of parking in a parking space from the location (e.g., lateral and longitudinal offset) of the cell in connection with the heading of the layer. Conversely, cells with lower values indicate the predicted ability of a vehicle to accurately park within the parking space from the location of the cell in connection with the heading of the layer. In some examples, the parking management component 102 may determine a parking cost based on one or more factors, such as whether a trajectory can be generated from the cell location (e.g., relative state) to the parking space (e.g., at the origin of the layer), a lateral error, and/or a heading error. Additional details for determining a parking cost (e.g., as shown in box 106) are described with respect to FIGS. 2 and 3.

At operation 112, the parking management component 102 may receive a parking space. In some instances, the parking management component 102 may receive a request to navigate to a destination. The parking management component 102 may receive and/or determine a set of parking spaces based on being within a threshold distance to the destination. For example, box 114 illustrates a vehicle approaching parking spaces. In this example, the box 114 includes a vehicle 116 that is approaching a first parking space 118 and a second parking space 120. The first parking space 118 and the second parking space 120 are parking spaces oriented in a direction perpendicular to a road boarder; however, other examples the first and second parking spaces may be oriented in a direction parallel or angled relative to a road boarder. In some instances, in addition to receiving the parking spaces, the parking management component 102 may receive a target pose (e.g., target lateral offset, target longitudinal offset, and/or target heading) associated with the parking space. For example, the parking management component 102 may receive a first target pose for the first parking space 118 and a second target pose for the second parking space 120.

In some instances, the parking management component 102 may generate trajectories from the position of the vehicle 116 to the first and/or second parking spaces. For example, box 114 illustrates a first trajectory 122 leading to the first parking space 118 and a second trajectory 124 leading to the second parking space 120. In such instances, the first trajectory 122 may include multiple predicted states that represent the state of the vehicle 116 at a specific location along the first trajectory 122. Further, the second trajectory 124 may also include multiple predicted states that represent the state of the vehicle 116 at a specific location along the second trajectory 124. In order to determine which trajectory to follow, the parking management component 102 may determine a first parking cost for the first trajectory 122 and a second parking cost for the second trajectory 124. Such parking costs may be determined based at least in part on the parking management component 102 determining and/or receiving a parking cost for some or all states associated with the trajectories.

At operation 126, the parking management component 102 may receive a cost associated with parking in the parking space based on a relative state of the vehicle. The parking management component 102 may receive the parking cost by accessing the grid 108 determined in operation 104. The grid 108 may be accessed by determining a relative state (e.g., relative heading offset, relative lateral offset, and relative longitudinal offset) of the vehicle at a state along the first or second trajectory with respect to the first or second parking space. For instance, the parking management component 102 may determine one or more parking costs for the one or more states of the first trajectory 122 and one or more parking costs for the one or more states of the second trajectory 124. In such instances, the parking management component 102 may determine a relative state for with each state of the first trajectory 122 with respect to the first parking space 118. Based on determining the relative states for each state of the first trajectory 122, the parking management component 102 may access the grid 108 to receive a parking cost for each relative state. The parking management component 102 may determine a sum of the parking costs for the various states which may be indicative of the parking cost associated with the first trajectory 122. In this example, the parking management component 102 may determine that the initial relative state of the vehicle 116 with respect to the first parking space 118 includes a relative heading of 0, a positive relative lateral offset (e.g., 5 meters), and a relative longitudinal offset representing the distance of the vehicle 116 from the first parking space 118. The parking management component 102 may determine relatives states for the remaining states of the first trajectory 122 which may be aligned with the trajectory at varying locations. Further, the parking management component 102 may perform similar operations to those described with respect to the first trajectory 122 and determine that the relative state of the vehicle 116 with respect to states of the second parking space 120 which may include an initial relative state with a relative heading of 0, a slight negative relative lateral offset (e.g., −2 meters), and a relative longitudinal offset representing the distance of the vehicle 116 from the second parking space 120. Of course, in other examples the relative states of the vehicle can be associated with different values. In some examples, the relative lateral and longitudinal offsets may be positioned beyond the extend of the layer of the grid. In such instances, the parking management component 102 may provide a default parking cost that is weighted based on the distance of the vehicle from the layer. However, in other examples the default parking cost may be based on one or more other factors. Additional details for determining a relative state of a vehicle are described with respect to FIGS. 2, 3, and 5.

In some examples, the parking management component 102 may access the grid 108 using the relative state of the vehicle 116. Specifically, the parking management component 102 may identify or otherwise determine a layer of the grid that corresponds to the relative heading of the vehicle and determine a parking score from the layer based on identifying a cell within the layer according to the relative lateral and/or longitudinal offsets of the relative state. In various examples, such parking scores may be interpolated (e.g., using bilinear, trilinear, cubic, etc. interpolations) such that a more accurate cost value is used in assessing the various trajectories having states (e.g., headings, velocities, positions, accelerations, etc.) which don't align with values within the grid. For example, box 128 illustrates a layer 130 of the grid 108 based on the relative heading of the vehicle 116. In this example, the layer 130 may correspond to a heading of 0 degrees. Further, the box 128 may include a parking space 132 located on a side edge of the layer 130. In some instances, the parking space 132 may correspond to the first and/or second parking spaces. The layer 130 may include multiple cells containing parking costs associated with the efficacy of navigating a vehicle from a cell location to the parking space 132 further based on the relative vehicle heading. In this example, the parking management component 102 may determine which cell the vehicle is associated with based on the relative state. Here, the parking management component 102 may utilize the same layer 130 for the initial states of the vehicle 116 following the first or second trajectories in order to determine the parking cost for the relative states based on relative heading being the same (e.g., 0) for both parking spaces. In this instance, the parking cost for the initial state of the first trajectory 122 may be "0.6", as the relative longitudinal offset of the vehicle 116 with respect to the first parking space 118 positions the vehicle 116 three rows away from the parking space 132, and the positive lateral offset positions the vehicle 116 slightly to the right the parking space 132. Further the parking cost for the initial state of the second trajectory 124 may be "0", as the relative longitudinal offset positions the vehicle 116 three rows away from the parking space 132, and the minimal lateral offset positions the vehicle 116 the center column of the layer 130. The parking management component 102 may access the grid for some or all of the relative states of the first and/or second trajectories. In such instances, the parking management component 102 may determine an overall parking cost for the first trajectory 122 by determining a sum of the parking costs for each state along the first trajectory 122. Further, the parking management component 102 may determine an overall parking cost for the second trajectory 124 by determining a sum of the parking costs for each state along the second trajectory 124.

At operation 134, the parking management component 102 may control the vehicle to follow a trajectory based on the cost. The parking management component 102 may associate the overall parking costs with the trajectories and, in order to determine which trajectory to follow, input such trajectories and/or costs into a tree search. For example, box 136 illustrates the vehicle 116 parked within the second parking space 120. Specifically, the parking management component 102 may determine that the second trajectory 124 has the lowest overall cost, and as such, may determine to follow the second trajectory 124 to the second parking space 120.

Figure 2:
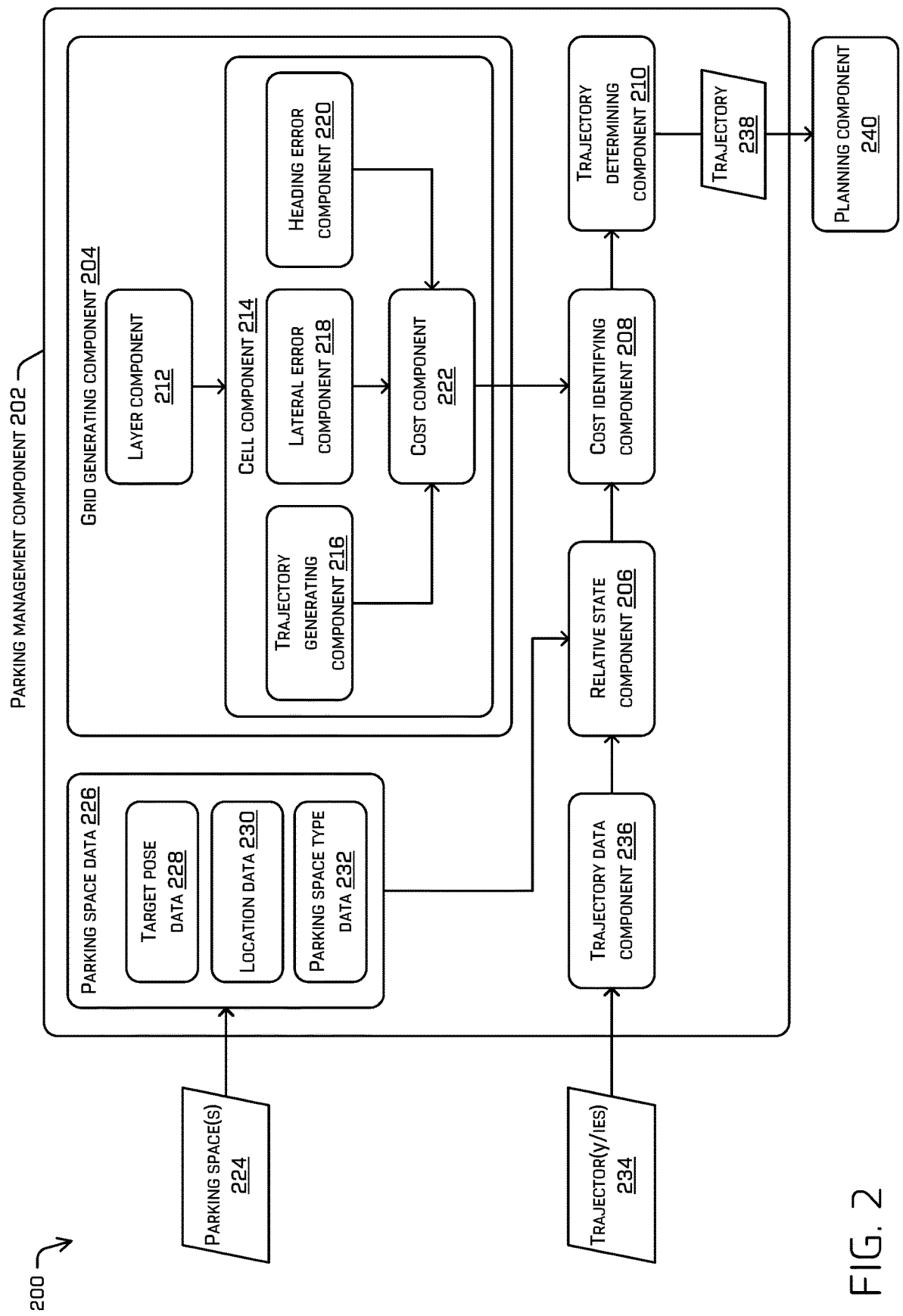
FIG. 2 illustrates an example computing system including a parking management component configured to determine a trajectory to follow based on three-dimensional grid data, in accordance with one or more examples of the disclosure.

FIG. 2 illustrates an example computing system 200 including a parking management component 202 configured to determine a trajectory to follow based on three-dimensional grid data.

In some examples, the parking management component 202 may be similar or identical to the parking management component 102 described above, or in any other examples herein. As noted above, in some cases the parking management component 202 may be implemented within or otherwise associated with a perception component, a prediction component, and/or a planning component of an autonomous vehicle. In some examples, the parking management component 202 may include various components, described below, configured to perform different functionalities of a parking trajectory determining technique. In some examples, some or all of the subcomponents of the parking management component 102 may be integrated in a remote server-based system while other subcomponents may be integrated in on-vehicle systems. In some examples, the parking management component 202 may include a grid generating component 204 configured to determine a three-dimensional grid, a relative state component 206 configured to determine a relative state of a vehicle relative to a parking space, a cost identifying component 208 configured to receive a parking cost associated with following a trajectory to the parking space, and/or a trajectory determining component 210 configured to select or otherwise determine a candidate trajectory to follow.

In some examples, the parking management component 202 may include a grid generating component 204 configured to determine a three-dimensional grid. The grid generating component 204 may determine a three-dimensional grid during a pre-computation stage and/or prior to the vehicle moving throughout the environment. A pre-computation stage may be a moment in which the vehicle turns on, initializes, and/or any other situation. Determining the grid during a pre-computation stage (e.g., or offline) may enhance processing speeds, as the vehicle may not have to perform the operations needed to generate a parking scores while traversing an environment. Rather, upon receiving parking spaces and/or generating trajectories to such parking spaces, the vehicle may access the already generated grid to receive the already generated parking scores. However, in other examples the grid may include more or less dimensions (e.g., add a velocity, acceleration, etc. dimension).

In some examples, the grid generating component 204 may include subcomponents which may include a layer component 212 and a cell component 214. The layer component 212 may be configured to determine or otherwise generate one or more layers of the grid. In such cases, the layers may be associated with a heading angle of a vehicle. The layer component 212 may determine any number of layers at any heading angle. Further, the layer component 212 may determine layers of any dimension and/or size (e.g., 20×40 meters, 20×20 meters, 100×100 meters, etc.). As described above, the layer component may determine layers associated with heading angles between a range of degrees. For example, the layer component 212 may determine layers between the heading angles of −90 to 90 degrees (e.g., −pi/2 to pi/2). However, this is not intended to be limiting, in other examples the range of degrees may be larger or smaller.

As shown in FIG. 2, the cell component 214 of the grid generating component 204 may include subcomponents which may include a trajectory generating component 216, a lateral error component 218, a heading error component 220, and/or a cost component 222. In some examples, the cell component 214 may be configured to break down the layers into one or more cells. In some instances, the cell component 214 may determine cells having differing resolution levels (e.g., differing dimensions, shapes, and/or sizes of the cells). Specifically, the cell component 214 may determine a first resolution level for the cells of a first layer while determining a second resolution level for the cells of a second layer. Further, the cell component 214 may determine cells of different resolution levels within the same layer. The cell component 214 may determine an x-y coordinate (e.g., lateral and longitudinal offset) or a range of x-y coordinates for each cell.

In some instances, the cell component 214 may generate a parking score for each cell. The cell component 214 may determine a lower bound parking cost based on a number of factors, such as whether a trajectory can be generated from the cell location (e.g., relative state) to the parking space (e.g., at the origin of the layer), a lateral error, and/or a heading error. In some examples, the trajectory generating component 216 may be configured to determine whether a trajectory can be generated from a cell location to a parking space based at least in part on kinematics and/or dynamic limitations of the vehicle. For example, the trajectory generating component 216 may attempt to generate a trajectory using the state information of the cell (e.g., longitude and latitude) and layer (e.g., heading), in addition to location data of the parking space. The trajectory generating component 216 may send the result of the attempted trajectory generation to a cost component 222.

In some examples, if the trajectory generating component 216 successfully generated a trajectory from the cell to the parking space, the lateral error component 218 and the heading error component 220 may determine lateral and heading errors of the trajectory. Specifically, the lateral error component 218 and the heading error component 220 may identify a parking state (e.g., representation of the state (e.g., latitude, longitude, heading) of the vehicle within the parking space) for the trajectory. In some examples, a trajectory may have multiple states that represent the state of a vehicle at a specific moment on the trajectory. The lateral error component 218 and the heading error component 220 may identify the parking state of the vehicle following the trajectory based on a predicted velocity being less than or equal to a threshold velocity. Based on identifying the parking state, the lateral error component 218 may be configured to determine a lateral error by comparing the lateral offset of the parking state with the target lateral offset of the parking space. Further, the heading error component 220 may be configured to determine a heading error by comparing the heading angle of the parking state with the target heading angle of the parking space. In such instances, the lateral and heading error components may send such error values to the cost component 222.

In some examples, the cost component 222 may be configured to determine a parking cost for a cell based on the results from the trajectory generating component 216, lateral error component 218, and/or the heading error component 220. Specifically, the cost component 222 may determine the parking cost by combining (e.g., using mathematical operations) the result of the attempt to generate a trajectory, the lateral error, and/or the heading error. In some examples, the cost component 222 may send the parking cost to the cost identifying component 208.

In some examples, the parking management component 202 may receive one or more parking spaces 224. The parking management component 202 may receive the parking spaces 224 from a planning component, a prediction component, a database (e.g., on-vehicle database or off-vehicle database) available to the vehicle, and/or any other component. The databases may include map data that indicates the locations of parking spaces 224 proximate the destination and/or target poses associated therewith. Additionally, the parking management component 202 may be determined or otherwise identified based on sensor data captured from a vehicle. Accordingly, the parking spaces 224 may be parking spaces which are within a threshold distance from the destination of the vehicle. In addition to receiving the parking space(s) and the associated location(s), the parking management component 202 may receive additional information about the parking space. The parking management component 202 may store some or all parking space information within a parking space data component 226.

In some instances, the parking space data component 226 may include subcomponents which may include a target pose data component 228 configured to receive, store, and/or analyze target poses associated with specific parking spaces 224. The parking space data component 226 may also include a location data component 230 configured to receive, store, and/or analyze the location of such parking spaces 224. Further, the parking space data component 226 may include a parking space type data component 232 configured to receive, store, and/or analyze the type of parking space that was received. In some examples, the parking space data component 226 may be configured to send parking space data to the relative state component 206.

In some examples, the parking management component 202 may receive one or more trajectories 234. Such trajectories 234 may be a path of the vehicle based on a combination of a current position of the vehicle, the vehicle dynamics, and/or map data. In some examples, some or all of the trajectories 234 may differ from one another based on the velocity, the pose, and/or the acceleration of such trajectories 234. In some examples, the trajectories 234 may include numerous predicted states that represent the state information of the vehicle at a specific location along the trajectories 234. For example, a trajectory 234 may comprise a number of nodes that represents what the state of a vehicle may be at a specific moment on the trajectory 234 and/or associated control information. State information may include location data, pose data (e.g., lateral offset data, longitudinal offset data, heading offset data), velocity data, acceleration data, and/or other elements. In some examples, the parking management component 202 may store such trajectory 234 information within a trajectory data component 236.

In some examples, the parking management component 202 may include a relative state component 206 configured to determine a relative state of a vehicle relative to a parking space 224. The relative state component 206 may determine a relative state of the vehicle in order to receive a parking cost of a state of the trajectory 234 from the grid determined by the grid generating component 204, as described above. In some examples, the relative state component 206 may receive information about the parking spaces 224 from the parking space data component 226. The relative state component may use the target pose data and the location data in conjunction with state information of the vehicle along the trajectory 234 to determine the relative state. Specifically, the relative state component 206 may identify the one or more states of the trajectory 234 and compare the current heading angle of the vehicle at each state with the target heading angle of the parking space 224 (e.g., the multiple states along a trajectory and/or a final or target state). The relative heading offset for a state may be the difference in angle between the vehicle's heading and the target heading. Further, the relative state component 206 may compare the current latitude of the vehicle at a state with the target latitude of the parking space 224. The relative lateral offset may be difference between the current latitude and the target latitude. Further, the relative state component 206 may compare the current longitude of the vehicle at a state with the target longitude of the parking space 224. The relative longitudinal offset may be difference between the current longitude and the target longitude. In some examples, the relative state component 206 may determine the relative states for one or more trajectories 234 leading to one or more parking spaces 224 in order to determine which trajectory 234 to follow.

In some examples, the parking management component 202 may include a cost identifying component 208 configured to receive a parking cost associated with a state of a trajectory. The cost identifying component 208 may receive the relative state information from the relative state component 206 and use such information to access the grid generated in the grid generating component 204. Specifically, the grid may be organized with layers corresponding to heading angles, and cells corresponding to lateral and longitudinal offsets. Accordingly, the cost identifying component 208 may identify the relevant layer based on the relative heading angle. Further, the cost identifying component 208 may identify the relevant cell based on the relevant lateral and longitudinal offsets. In such instances, the cost identifying component 208 may receive the parking cost located within the cell. The cost identifying component 208 may access the grid and receive the parking costs for some or all of the relative states associated with the trajectory 234. Upon identifying the parking cost for each state of the trajectory 234, the cost identifying component 208 may add the parking costs of each state to determine an overall parking cost that is to be associated with the trajectory 234. The cost identifying component 208 may send the overall parking cost(s) to the trajectory determining component 210.

In some examples, the parking management component 202 may include a trajectory determining component 210 configured to select or otherwise determine a candidate trajectory to follow. The trajectory determining component 210 may receive the overall parking cost(s) from the cost identifying component 208 and associate the parking costs with the respective trajectories. The trajectory determining component 210 may input the parking costs and/or trajectories into a tree search. Based on the tree search (which may include other costs, including but not limited to one or more of an obstacle cost, a reference cost, a steering cost, an acceleration cost, and the like), the trajectory determining component 210 may determine a trajectory 238 for the vehicle to follow. In such instances, the trajectory determining component 210 may send the trajectory 238 to a planning component 240. In such instances, the planning component 240 may utilize the trajectory 238 by causing the vehicle to follow the trajectory 238 to the parking space 224.

Figure 3:
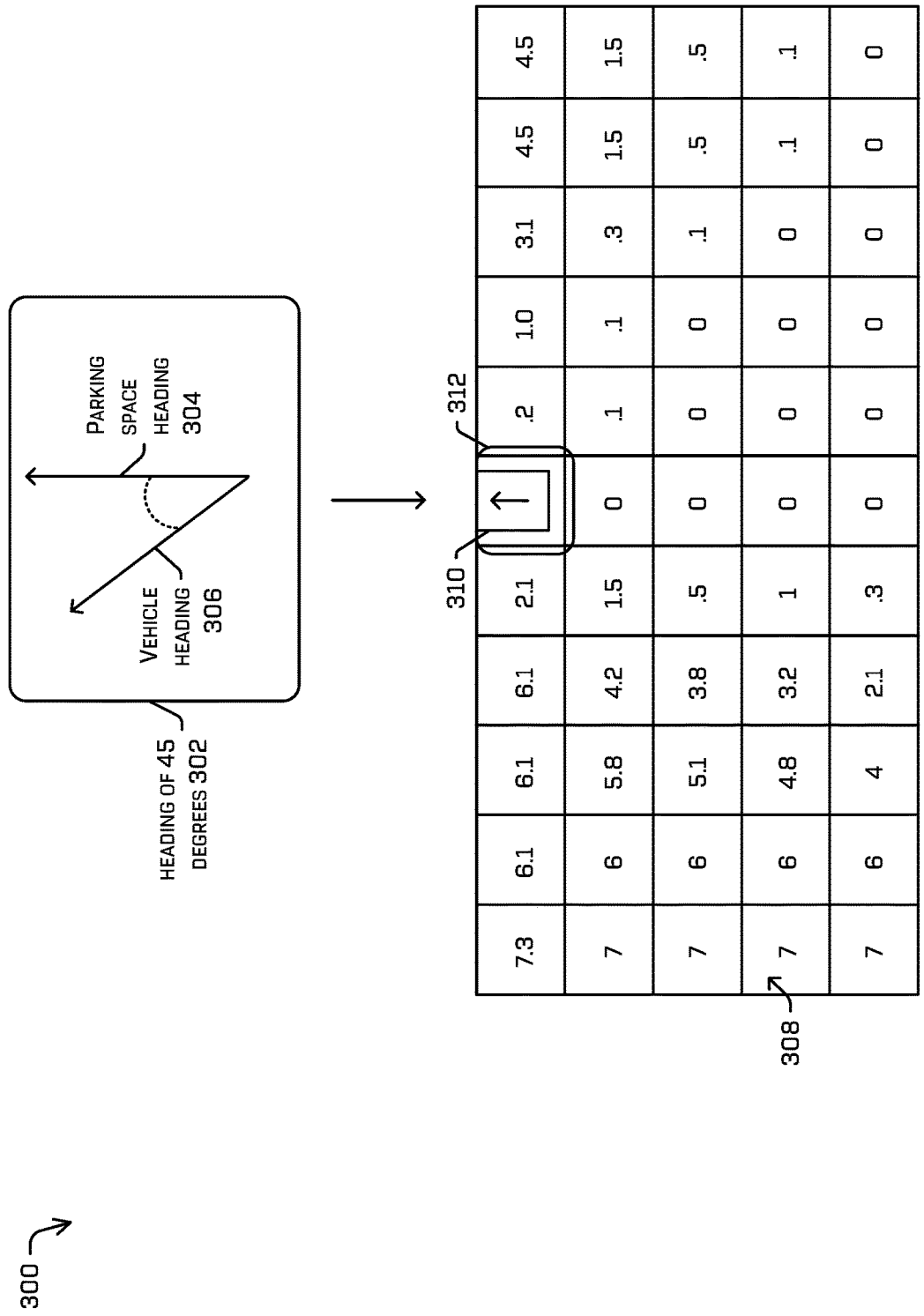
FIG. 3 depicts an example layer of a three-dimensional grid, in accordance with one or more examples of the disclosure.

FIG. 3 depicts an example layer 300 of a three-dimensional grid. Specifically, FIG. 3 describes a layer associated with a heading angle.

In this example, the example layer 300 of the grid may be similar or identical to the layer described in FIGS. 1 and 2. In some examples, FIG. 3 shows a box 302 indicating a relative heading of 45 degrees. The box 302 includes a first heading arrow 304 illustrating the heading of the parking space. The first heading arrow 304 has a heading angle of 0 degrees. The box 302 also includes a second heading arrow 306 illustrating the heading angle of a vehicle. As such, a parking management component 202 may compare the first heading arrow 304 with the second heading arrow 306 to determine that the relative heading of the vehicle is 45 degrees. In such instances, the parking management component 202 may access a grid to identify the layer associated with a heading angle of 45 degrees.

In this example, the example layer 300 may include multiple cells 308. For example, the layer 300 may include five rows of cells 308 and ten columns of cells 308. As shown in FIG. 3, the cells 308 may include a value that indicates the cost of following a trajectory to a parking space 310 based on the position and/or orientation of the vehicle. In this example, as the heading angle is 45 degrees, cells 308 on the right portion of the layer 300 may have lower parking costs based on the heading of the vehicle oriented towards the parking space 310.

In some examples, FIG. 3 may also include a region 312 surrounding the parking space 310. As described above, when a vehicle is within a threshold distance from the parking space 310, trajectory generating techniques may be insufficient. As such, cost values for such locations may be inaccurately high. Thus, the parking management component may determine a region 312 surrounding the parking space. In this example the region 312 is rectangular; however, in other examples the region 312 may be square, circular, or any other shape. Further, FIG. 3 depicts the region 312 as creating a buffer around three of the parking space 310; however, in other examples the region 312 may create a buffer on some or all sides (one or more sides). In some instances, the region 312 may include a parking cost. The parking management component 202 may determine that when a vehicle is located with the region 312, the parking cost of the region applies. Conversely, if the vehicle is located outside of the region 312, then the parking management component 202 may send the parking cost located within the cell.

Figure 4:
FIG. 4 illustrates example layers of a three-dimensional grid based on heading angle, in accordance with one or more examples of the disclosure.

FIG. 4 illustrates example layers 400 of a three-dimensional grid based on heading angle. Specifically, FIG. 4 illustrates multiple layers within a grid and the various parking costs located therein.

In some examples, the example layers 400 may include multiple layers of a grid at differing heading angles. For example, the example layers 400 includes a first layer 402 associated with a heading angle of 45 degrees, a second layer 404 associated with a heading angle of 0 degrees, and a third layer 406 associated with a heading angle of −45 degrees. As shown, the three layers are of the same or similar dimension, including a similar number and/or size of cells.

In some examples, the parking management component 202 may determine parking costs for the cells within the layers. For example, the first layer 402 may include a parking score within each cell. The parking score may be based on the cell location (e.g., lateral and/or longitudinal offsets) and the heading angle of the first layer 402. The parking scores within the cells of the second layer 404 may be based on the cell location and the heading angle of the second layer 404. The parking scores within the cells of the third layer 406 may be based on the cell location and the heading angle of the third layer 406.

Figure 5A:
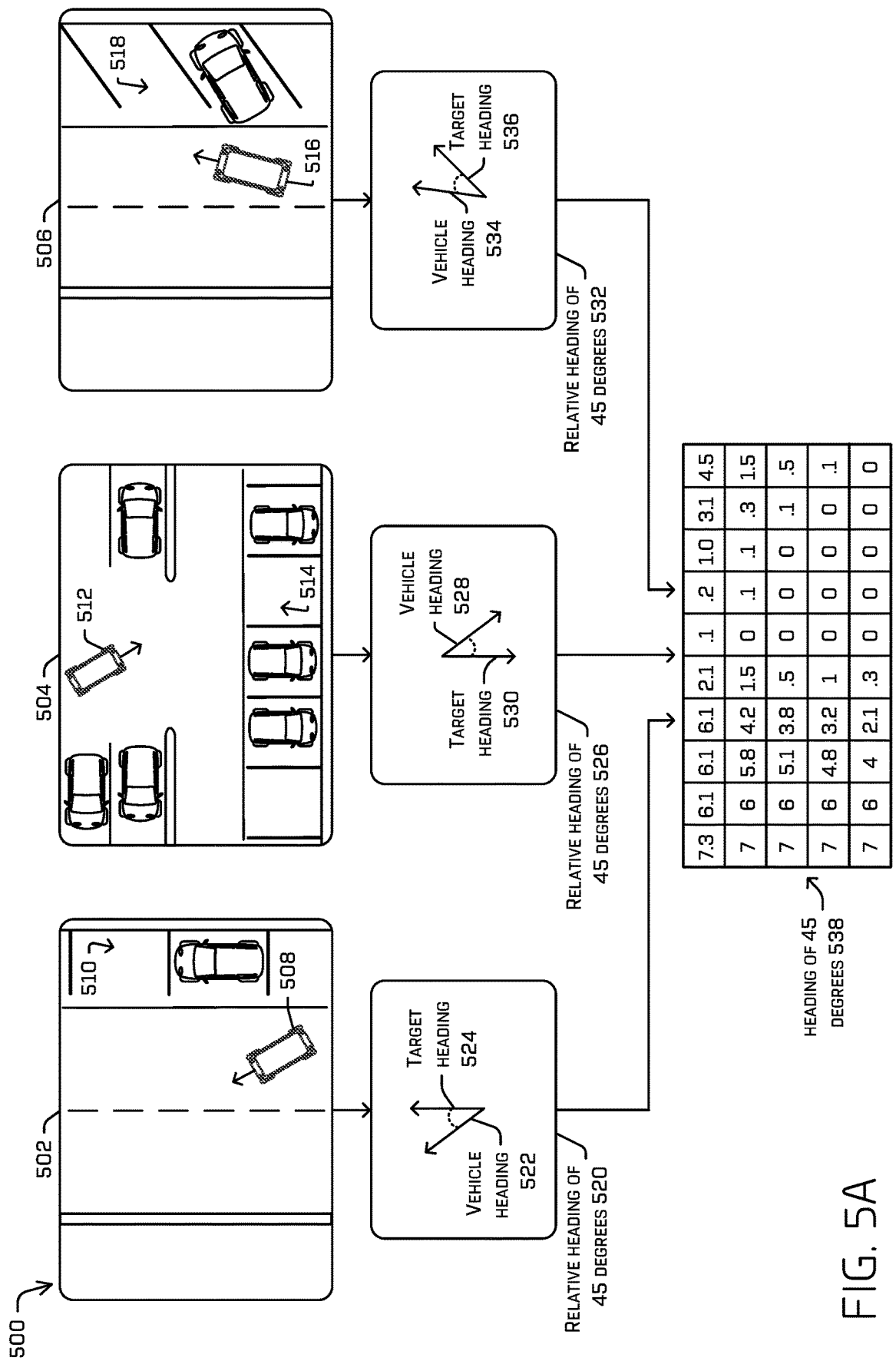
FIG. 5A illustrates accessing a three-dimensional grid based on identifying relative heading angles from multiple example driving environments, in accordance with one or more examples of the disclosure.

FIG. 5A illustrates accessing a three-dimensional grid based on identifying relative heading angles from multiple example driving environments 500. Specifically, FIG. 5 illustrates utilizing a single layer of the grid for three different driving environments and/or parking space types.

In this example, the example driving environments 500 may include three different driving scenarios. For example, FIG. 5 includes a first environment 502 in which a vehicle 508 is navigating to a parking space 510, a second environment 504 in which a vehicle 512 is navigating to a parking space 514, and a third environment 506 in which a vehicle 516 is navigating to a parking space 518.

In some instances, a parking management component may determine, based at least in part on identifying an initial state of the vehicle following the trajectories, a relative heading of the vehicles with respect to the parking spaces. For example, the parking management component may determine a first relative heading for the vehicle 508 relative to the parking space 510, a second relative heading for the vehicle 512 relative to the parking space 514, and a third relative heading for the vehicle 516 relative to the parking space 518. In this example, determining the relative heading between the vehicles and the parking spaces may include comparing a current heading of the vehicle with a target heading of the parking space. For instance, box 520 illustrates a comparison between the current heading 522 of the vehicle 508 and the target heading 524 of the parking space 510. In this instance, the parking management component may determine that the relative heading for the vehicle 508 is 45 degrees. Further, box 526 illustrates a comparison between the current heading 528 of the vehicle 512 and the target heading 530 of the parking space 514. In this instance, the parking management component may determine that the relative heading for the vehicle 512 is 45 degrees. Box 532 illustrates a comparison between the current heading 534 of the vehicle 516 and the target heading 536 of the parking space 518. In this instance, the parking management component may determine that the relative heading for the vehicle 516 is 45 degrees.

Based on determining that the relative heading for the initial state for each trajectory is 45 degrees for the first, second, and third environments, the parking management component may access a grid and identify a layer of the grid that corresponds to the relative heading. As described above, the parking management component may determine layers of the grid to be associated with a heading of a vehicle. As such, when accessing the grid, the parking management component can identify a layer which has a same or similar heading angle as the relative heading angle. As shown, the parking management component may identify a layer 538 which may correlate to a heading angle of 45 degrees. In some examples, despite the first environment 502, the second environment 504, and the third environment 506 being in a different environments, parking spaces oriented in different ways, and vehicles navigating in different directions, the parking management component may utilize the same layer 538 to receive a parking cost for each environment.

Figure 5B:
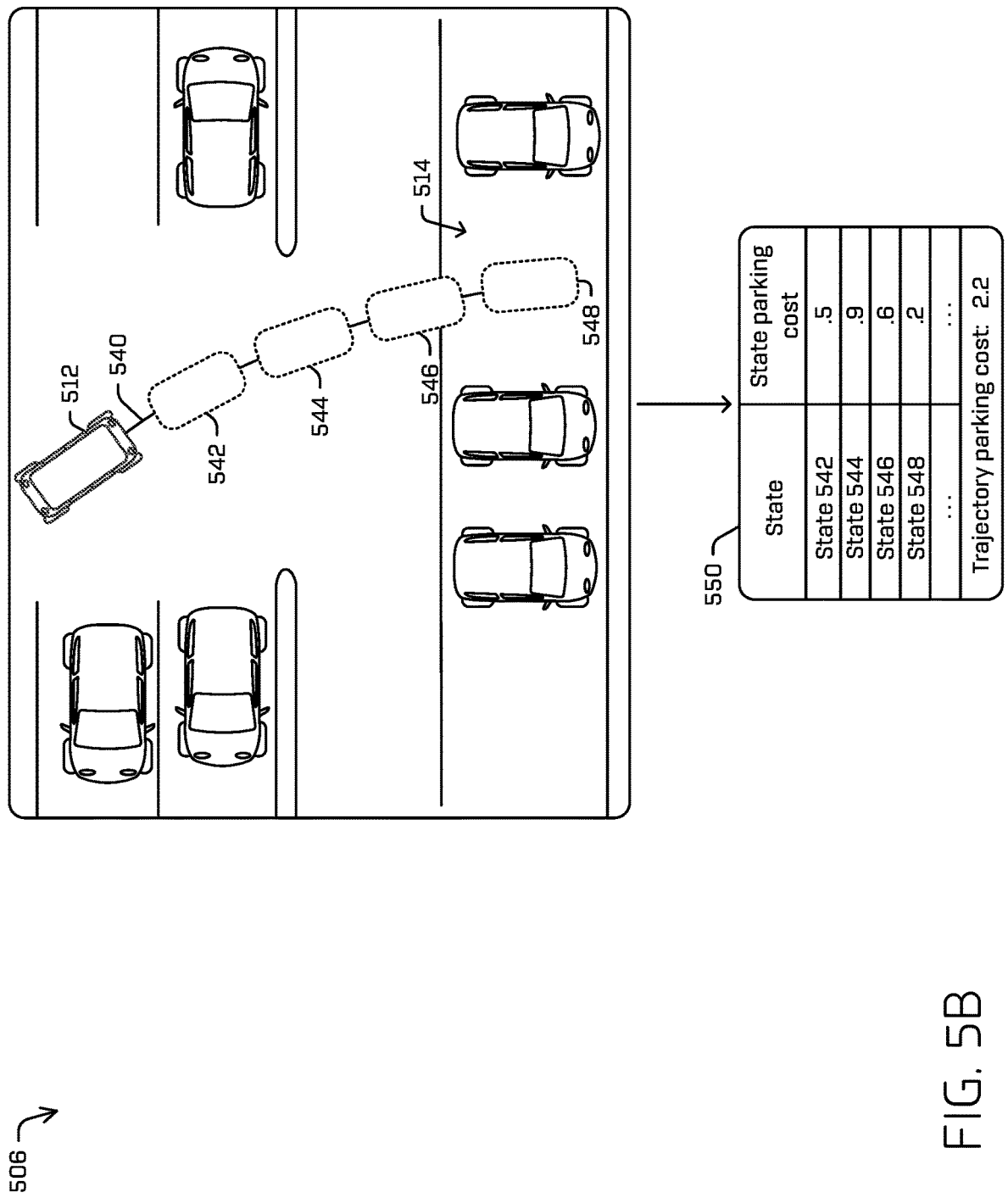
FIG. 5B depicts an example environment of a vehicle following a trajectory with multiple states to a parking space, in accordance with one or more examples of the disclosure.

FIG. 5B depicts an example environment 504 of a vehicle 512 following a trajectory with multiple states to a parking space. Specifically, FIG. 5B illustrates determining parking costs for the states of a trajectory and using such parking costs to determine an overall parking cost for the trajectory.

In this example, the example environment 504 may be similar or identical to the second environment 504 described in FIG. 5A. As shown, the vehicle 512 may have a trajectory 540 which may instruct the vehicle 512 to traverse to a parking space 514. The trajectory 540 may include any number of states that represent the state information of the vehicle at a specific location along the trajectory 540. Specifically, the trajectory 540 may include a state 542, a state 544, a state 546, and a state 548. In some examples, the vehicle 512 may determine a parking cost for the trajectory 540 by receiving (e.g., from a three-dimensional grid) a parking cost for each of the four states, and determining a sum of such parking costs. Of course, in other examples the trajectory 540 may have more or less states at different locations along the trajectory 540.

Figure 6:
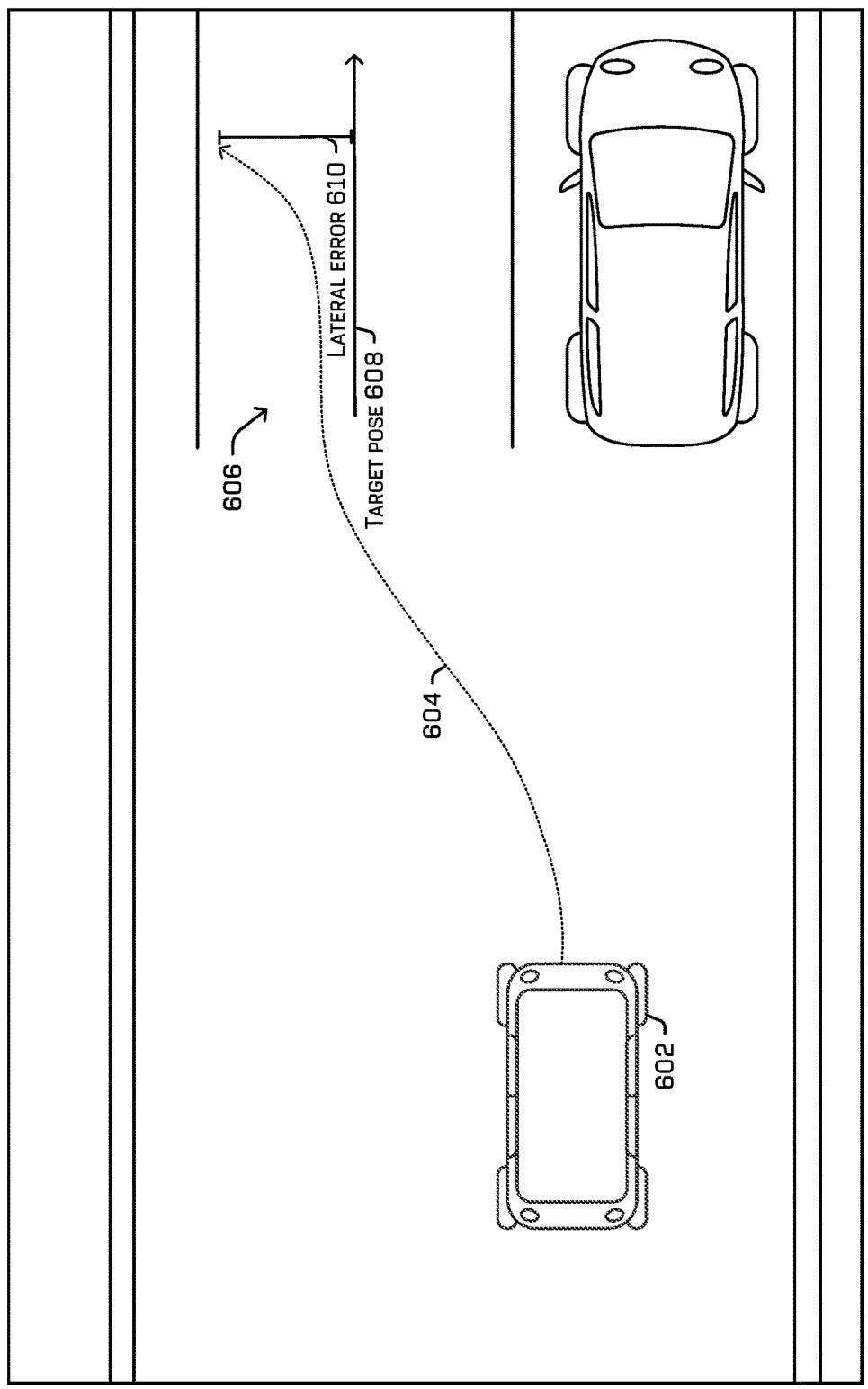
FIG. 6 depicts an example environment of a vehicle with a trajectory leading to a parking space, in accordance with one or more examples of the disclosure.

As shown, FIG. 5B may include a table 550 that illustrates the parking costs for some or all states of the trajectory 540 and an overall trajectory cost. For instance, the table 550 may include a first column that indicates the various states being evaluated and a second column that indicates the parking cost for each state. In this example, the vehicle 512 may determine a relative state of the vehicle 512 at state 542. The vehicle may use the relative state to access the three-dimensional grid (e.g., described in FIGS. 1-5A) in order to receive the parking cost associated with the state 542. The vehicle may perform similar or identical operations for the other states of the trajectory 540. As shown, the parking cost of state 542 is 0.5, the parking cost of state 544 is 0.9, the parking cost of state 546 is 0.6, and the parking cost of state 548 is 0.2. In some examples, the vehicle may determine a parking cost for the trajectory 540 by adding the parking costs for each of the four states together. The result of the summed parking costs of the states may represent a parking cost for the trajectory 540. In this example, the parking cost for the trajectory 540 may be 2.2. Of course, these values are exemplary and any values can be used. FIG. 6 depicts an example environment 600 of a vehicle 602 with a trajectory 604 leading to a parking space 606. Specifically, FIG. 6 illustrates determining a lateral error and/or a heading error which may be used to determine a parking cost for a cell within a three-dimensional grid.

In this example, the example environment 600 may include a vehicle 602. The vehicle 602 may have a trajectory 604 which may instruct the vehicle 602 to traverse to a parking space 606. As described above, the vehicle 602 may receive the parking space 606, the location of the parking space 606, and a target pose 608 associated with the parking space 606. As shown in FIG. 6, the target pose 608 may extend through a middle portion of the parking space 606. The target pose 608 may represent an optimal position and orientation (two- or three-dimensional heading) of a vehicle 602 within the parking space 606. The target position may include a target lateral offset (e.g., y-axis) coordinate and a target longitudinal offset (e.g., x-axis) coordinate of the vehicle 602.

In some examples, the vehicle 602 may determine a lateral error 610 and a heading error between a parking state of the vehicle 602 following the trajectory 604 and the target pose 608. The vehicle may determine a parking state of the vehicle following the trajectory 604 by identifying a vehicle state along the trajectory 604 in which the vehicle velocity is below a threshold value. The parking state may include a predicted lateral offset and/or heading angle. As such, the vehicle 602 may determine the lateral error 610 by comparing the lateral offset of the vehicle with the target lateral offset of the target pose 608. The lateral error 610 may be the difference in values. Further, the vehicle 602 may determine a heading error by comparing the heading angle of the vehicle at the parking state with the target heading angle the target pose 608. The heading error may be the difference between such values. In some examples, the parking management component may use the lateral and heading errors to determine a parking cost associated with a cell.

Figure 7:
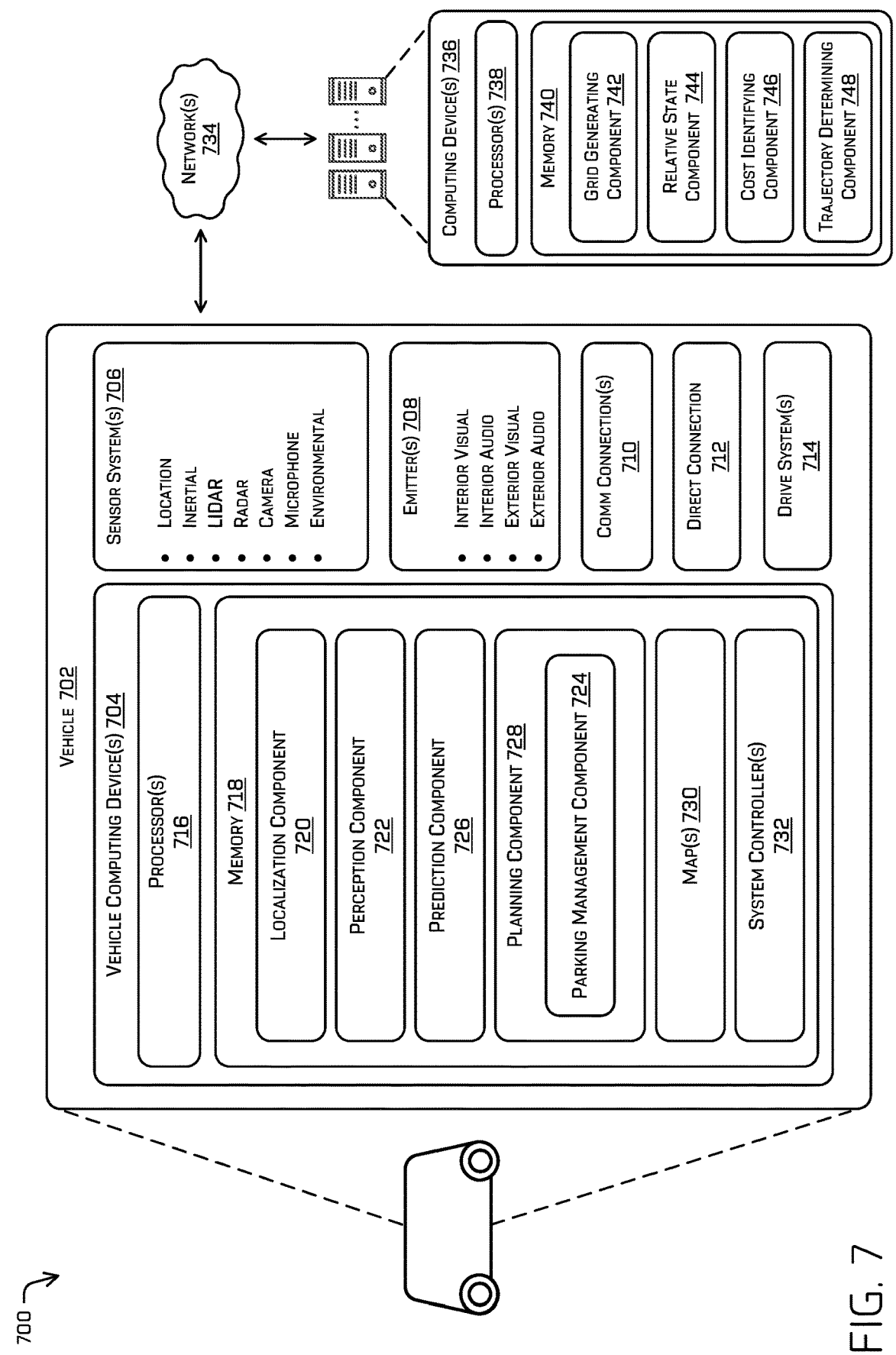
FIG. 7 depicts a block diagram of an example system for implementing various techniques described herein.

FIG. 7 is a block diagram of an example system 700 for implementing the techniques described herein. In at least one example, the system 700 may include a vehicle, such as vehicle 702. The vehicle 702 may include one or more vehicle computing devices 704, one or more sensor systems 706, one or more emitters 708, one or more communication connections 710, at least one direct connection 712, and one or more drive systems 714.

The vehicle computing device 704 may include one or more processors 716 and memory 718 communicatively coupled with the processor(s) 716. In the illustrated example, the vehicle 702 is an autonomous vehicle; however, the vehicle 702 could be any other type of vehicle, such as a semi-autonomous vehicle, or any other system having at least an image capture device (e.g., a camera-enabled smartphone). In some instances, the autonomous vehicle 702 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 702 may be a fully or partially autonomous vehicle having any other level or classification.

In the illustrated example, the memory 718 of the vehicle computing device 704 stores a localization component 720, a perception component 722, a prediction component 726, a planner component 728 including a parking management component 724, one or more system controllers 732, and one or more maps 730 (or map data). Though depicted in FIG. 7 as residing in the memory 718 for illustrative purposes, it is contemplated that the localization component 720, the perception component 722, the prediction component 726, the planner component 728 including an parking management component 724, system controller(s) 732, and/or the map(s) may additionally, or alternatively, be accessible to the vehicle 702 (e.g., stored on, or otherwise accessible by, memory remote from the vehicle 702, such as, for example, on memory 740 of one or more computing device 736). In some examples, the memory 740 may include a grid generating component 742, a relative state component 744, a cost identifying component 746, and a trajectory determining component 748.

In at least one example, the localization component 720 may include functionality to receive sensor data from the sensor system(s) 706 to determine a position and/or orientation of the vehicle 702 (e.g., one or more of an x-, y-, z-position, roll, pitch, or yaw). For example, the localization component 720 may include and/or request/receive a map of an environment, such as from map(s) 730, and may continuously determine a location and/or orientation of the vehicle 702 within the environment. In some instances, the localization component 720 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 702. In some instances, the localization component 720 may provide data to various components of the vehicle 702 to determine an initial position of the vehicle 702 for determining the relevance of an object to the vehicle 702, as discussed herein.

In some instances, the perception component 722 may include functionality to perform object detection, segmentation, and/or classification. In some examples, the perception component 722 may provide processed sensor data that indicates a presence of an object (e.g., entity) that is proximate to the vehicle 702 and/or a classification of the object as an object type (e.g., car, pedestrian, cyclist, animal, building, tree, road surface, curb, sidewalk, unknown, etc.). In some examples, the perception component 722 may provide processed sensor data that indicates a presence of a stationary entity that is proximate to the vehicle 702 and/or a classification of the stationary entity as a type (e.g., building, tree, road surface, curb, sidewalk, unknown, etc.). In additional or alternative examples, the perception component 722 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 726 may generate one or more probability maps representing prediction probabilities of possible locations of one or more objects in an environment. For example, the prediction component 726 may generate one or more probability maps for vehicles, pedestrians, animals, and the like within a threshold distance from the vehicle 702. In some instances, the prediction component 726 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 726 may generate predicted trajectories of objects (e.g., objects) in an environment. For example, the prediction component 726 may generate one or more predicted trajectories for objects within a threshold distance from the vehicle 702. In some examples, the prediction component 726 may measure a trace of an object and generate a trajectory for the object based on observed and predicted behavior.

In general, the planner component 728 may determine a path for the vehicle 702 to follow to traverse through an environment. For example, the planner component 728 may determine various routes and trajectories and various levels of detail. For example, the planner component 728 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 728 may generate an instruction for guiding the vehicle 702 along at least a portion of the route from the first location to the second location. In at least one example, the planner component 728 may determine how to guide the vehicle 702 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planner component 728 may select a trajectory for the vehicle 702.

In other examples, the planner component 728 may alternatively, or additionally, use data from the localization component 720, the perception component 722, and/or the prediction component 726 to determine a path for the vehicle 702 to follow to traverse through an environment. For example, the planner component 728 may receive data (e.g., object data) from the localization component 720, the perception component 722, and/or the prediction component 726 regarding objects associated with an environment. In some examples, the planner component 728 receives data for relevant objects within the environment. Using this data, the planner component 728 may determine a route to travel from a first location (e.g., a current location) to a second location (e.g., a target location) to avoid objects in an environment. In at least some examples, such a planner component 728 may determine there is no such collision-free path and, in turn, provide a path that brings vehicle 702 to a safe stop avoiding all collisions and/or otherwise mitigating damage.

The parking management component 724 may be perform any of the techniques described with respect to any of FIGS. 1-6 above with respect to determining parking trajectories to follow based on parking costs determined within a three-dimensional grid.

In at least one example, the vehicle computing device 704 may include one or more system controllers 732, which may be configured to control steering, propulsion, braking, safety, emitters, communication, and other systems of the vehicle 702. The system controller(s) 732 may communicate with and/or control corresponding systems of the drive system(s) 714 and/or other components of the vehicle 702.

The memory 718 may further include one or more maps 730 that may be used by the vehicle 702 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 702 may be controlled based at least in part on the map(s) 730. That is, the map(s) 730 may be used in connection with the localization component 720, the perception component 722, the prediction component 726, and/or the planner component 728 to determine a location of the vehicle 702, detect objects in an environment, generate routes, determine actions and/or trajectories to navigate within an environment.

In some examples, the one or more maps 730 may be stored on a remote computing device(s) (such as the computing device(s) 736) accessible via network(s) 734. In some examples, multiple maps 730 may be stored based on, for example, a characteristic (e.g., type of entity, time of day, day of week, season of the year, etc.). Storing multiple maps 730 may have similar memory requirements, but increase the speed at which data in a map may be accessed.

In some instances, aspects of some or all of the components discussed herein may include any models, techniques, and/or machine-learned techniques. For example, in some instances, the components in the memory 718 (and the memory 740, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet-50, ResNet-101, VGG, DenseNet, PointNet, Xception, ConvNeXt, and the like; visual transformer(s) (ViT(s)), such as a bidirectional encoder from image transformers (BEIT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, GPT, GPT-2, GPT-3, or the like. In some examples, the ML model discussed herein may comprise PointPillars, SECOND, top-down feature layers (e.g., see U.S. patent application Ser. No. 15/963,833, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

In at least one example, the sensor system(s) 706 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 706 may include multiple instances of each of these or other types of sensors. For instance, the lidar sensors may include individual lidar sensors located at the corners, front, back, sides, and/or top of the vehicle 702. As another example, the camera sensors may include multiple cameras disposed at various locations about the exterior and/or interior of the vehicle 702. The sensor system(s) 706 may provide input to the vehicle computing device 704. Additionally, or in the alternative, the sensor system(s) 706 may send sensor data, via the one or more networks 734, to the one or more computing device(s) 736 at a particular frequency, after a lapse of a predetermined period of time, in near real-time, etc.

The vehicle 702 may also include one or more emitters 708 for emitting light and/or sound. The emitter(s) 708 may include interior audio and visual emitters to communicate with passengers of the vehicle 702. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 708 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 702 may also include one or more communication connections 710 that enable communication between the vehicle 702 and one or more other local or remote computing device(s). For instance, the communication connection(s) 710 may facilitate communication with other local computing device(s) on the vehicle 702 and/or the drive system(s) 714. Also, the communication connection(s) 710 may allow the vehicle to communicate with other nearby computing device(s) (e.g., computing device 736, other nearby vehicles, etc.) and/or one or more remote sensor system(s) for receiving sensor data. The communications connection(s) 710 also enable the vehicle 702 to communicate with a remote teleoperations computing device or other remote services.

The communications connection(s) 710 may include physical and/or logical interfaces for connecting the vehicle computing device 704 to another computing device or a network, such as network(s) 734. For example, the communications connection(s) 710 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 702 may include one or more drive systems 714. In some examples, the vehicle 702 may have a single drive system 714. In at least one example, if the vehicle 702 has multiple drive systems 714, individual drive systems 714 may be positioned on opposite ends of the vehicle 702 (e.g., the front and the rear, etc.). In at least one example, the drive system(s) 714 may include one or more sensor systems to detect conditions of the drive system(s) 714 and/or the surroundings of the vehicle 702. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 714. In some cases, the sensor system(s) on the drive system(s) 714 may overlap or supplement corresponding systems of the vehicle 702 (e.g., sensor system(s) 706).

The drive system(s) 714 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 714. Furthermore, the drive system(s) 714 may also include one or more communication connection(s) that enable communication by the respective drive module with one or more other local or remote computing device(s).

In at least one example, the direct connection 712 may provide a physical interface to couple the one or more drive system(s) 714 with the body of the vehicle 702. For example, the direct connection 712 may allow the transfer of energy, fluids, air, data, etc. between the drive system(s) 714 and the vehicle. In some instances, the direct connection 712 may further releasably secure the drive system(s) 714 to the body of the vehicle 702.

In at least one example, the localization component 720, the perception component 722, the parking management component 724, the prediction component 726, the planner component 728, the one or more system controllers 732, and the one or more maps 730 may process sensor data, as described above, and may send their respective outputs, over the one or more network(s) 734, to the computing device(s) 736. In at least one example, the localization component 720, the perception component 722, the parking management component 724, the prediction component 726, the planner component 728, the one or more system controllers 732, and the one or more maps 730 may send their respective outputs to the computing device(s) 736 at a particular frequency, after a lapse of a predetermined period of time, in near real-time, etc.

In some examples, the vehicle 702 may send sensor data to the computing device(s) 736 via the network(s) 734. In some examples, the vehicle 702 may receive sensor data from the computing device(s) 736 and/or remote sensor system(s) via the network(s) 734. The sensor data may include raw sensor data and/or processed sensor data and/or representations of sensor data. In some examples, the sensor data (raw or processed) may be sent and/or received as one or more log files.

The computing device(s) 736 may include processor(s) 738 and a memory 740, which may include a grid generating component 742, a relative state component 744, a cost identifying component 746, and a trajectory determining component 748. In some examples, the memory 740 may store one or more of components that are similar to the component(s) stored in the memory 718 of the vehicle 702. In such examples, the computing device(s) 736 may be configured to perform one or more of the processes described herein with respect to the vehicle 702. In some examples, the grid generating component 742, the relative state component 744, the cost identifying component 746, and the trajectory determining component 748 may perform substantially similar functions as the parking management component 724.

The processor(s) 716 of the vehicle 702 and the processor(s) 738 of the computing device(s) 736 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 718 and memory 740 are examples of non-transitory computer-readable media. The memory 718 and memory 740 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 7 is illustrated as a distributed system, in alternative examples, components of the vehicle 702 may be associated with the computing device(s) 736 and/or components of the computing device(s) 736 may be associated with the vehicle 702. That is, the vehicle 702 may perform one or more of the functions associated with the computing device(s) 736, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Figure 8:
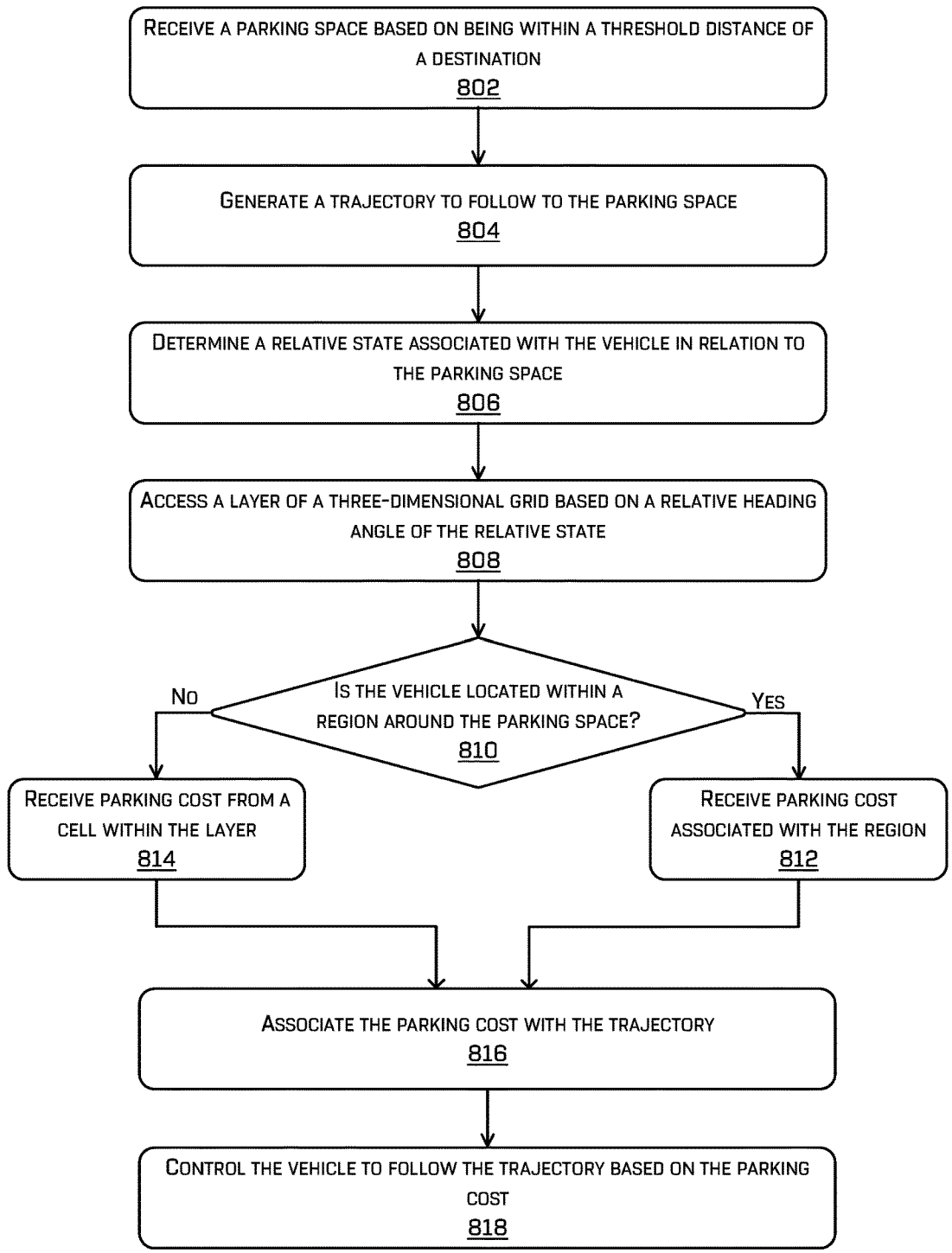
FIG. 8 is a flow diagram illustrating an example process of receiving a parking space, determining a relative state based on the parking space, accessing a three-dimensional grid based on the relative state, and determining a parking cost based on accessing the three-dimensional grid, in accordance with one or more examples of the disclosure.

FIG. 8 is a flow diagram illustrating an example process 800 of receiving a parking space, determining a relative state based on the parking space, accessing a three-dimensional grid based on the relative state, and determining a parking cost based on accessing the three-dimensional grid. As described below, the example process 800 may be performed by one or more computer computer-based components configured to implement various functionalities described herein. For instance, process 800 may be performed by a parking management component 202 configured determine a heuristic based grid containing parking costs, and use such a grid to determine a trajectory to follow to a parking space. As described above, the parking management component

202 may be integrated as an on-vehicle system in some examples. However, in other examples, the parking management component 202 may be integrated as a separate server-based system.

Process 800 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 802, the parking management component may receive a parking space based on being within a threshold distance of a destination. In some examples, the parking management component may receive one or more candidate parking spaces for the vehicle based on being within a threshold distance from the destination. The parking management component may receive a set of parking locations (e.g., parking spaces, parking garages, parking lots, etc.) proximate the destination. In addition to receiving the set of parking spaces and the associated locations of such parking spaces, the parking manager may also receive target poses associated with the parking spaces. A target pose may represent an optimal position and orientation (two- or three-dimensional heading) of a vehicle within the parking space. The target position may include a target lateral offset (e.g., y-axis) coordinate and a target longitudinal offset (e.g., x-axis) coordinate of the vehicle.

At operation 804, the parking management component may generate a trajectory to follow to the parking space. In some examples, the parking management component may generate a candidate trajectory for the vehicle to follow to a parking space. Upon receiving the set of potential parking spaces, the parking management component may generate one or more candidate trajectories to some or all parking spaces. As described in more detail below, the parking management component may receive and/or associate a parking cost with a trajectory based on accessing the grid.

At operation 806, the parking management component may determine a relative state associated with the vehicle in relation to the parking space. For example, the parking management component may determine a current pose (e.g., heading, latitude, longitude) of the vehicle. Further, the parking management component may determine a relative state of the vehicle by comparing the current pose of the vehicle with the target pose of the parking space. As there may be multiple candidate trajectories leading to multiple candidate parking spaces, in order to determine the cost for trajectories leading to different parking spaces, the parking management component may determine a different relative state with respect to some or all of the candidate parking spaces. The parking management component may use the one or more relative states to access the grid and receive one or more parking costs to be associated with the trajectories leading to such parking spaces.

At operation 808, the parking management component may access a layer of a three-dimensional grid based on a relative heading angle of the relative state. The parking management component may determine the grid during a pre-computation stage. In some examples, the grid may be a heuristic-based grid containing parking costs indicating the efficacy of parking in a parking space based on a relative state of a vehicle. The grid may include multiple layers, each layer may include multiple cells, each cell may include a value indicating a lower bound parking cost. In some examples, the parking management component may access a layer of the grid. As described above, layers of the grid may be arranged and/or organized by heading angle. As such, the parking management component may identify which layer of the grid to access based on a relative heading angle of the vehicle.

At operation 810, the parking management component may determine whether the vehicle is located within a region around the parking space. The parking management component may determine a region of any dimension and/or size (e.g., 2-meter buffer around the parking space, 5-meter buffer around the parking space, etc.). The parking management component may determine a parking cost for instances in which a vehicle is located therein. The region parking cost may be determined based on predicting that the vehicle corrects its heading with a constant curvature angle until reaching the target longitudinally. If the vehicle is located within the region (810: Yes), the parking management component may receive the parking cost that is associated with the region. At operation 812, the parking management component may receive the parking cost from the region based on determining that the vehicle is located therein.

Conversely, if the vehicle is not located within the region (810: No), the parking management component may receive a parking cost from a cell within the layer. At operation 814, the parking management component may utilize the relative lateral and longitudinal offsets of the vehicle to determine a cell associated with the relative position of the vehicle. For example, the parking management component may determine the cell that the vehicle is located within by comparing the relative longitudinal and lateral offset values with the x-y coordinates of the cells within the layer. The parking management component may receive the parking cost from the cell.

At operation 816, the parking management component may associate the parking cost with the trajectory. In some examples, the parking management component may associate the parking cost with the one or more candidate trajectories that lead to the particular parking space. The parking management component may identify the candidate trajectories that lead to the parking space and associate the parking cost with such candidate trajectories.

At operation 818, the parking management component may control the vehicle to follow the trajectory based on the parking cost. In some examples, the parking management component may select or otherwise determine a trajectory to follow to the parking space based on a sum of one or more costs (e.g., parking cost, comfort cost, safety cost, etc.). In such instances, the parking management component may select the trajectory with the lowest overall cost. The parking management component may determine which candidate trajectory to follow based on inputting the parking cost into a tree search. In such a tree search, trajectories may be selected and/or optimized based on associated costs, including all costs to arrive at a node along the tree (e.g., cost-to-come) and a cost to arrive at a final destination from the node (e.g., cost-to-go). In such examples, the parking cost may be associated with and infinite time horizon such that it is correctly accounted for in any cost-to-go optimizations. Upon determining the candidate trajectory from the tree search, the vehicle may follow the trajectory to the parking space. Further, the trajectory may cause the vehicle to park within the parking space.

EXAMPLE CLAUSES

A: A system comprising: one or more processors; and one or more non-transitory computer-readable media storing computer-executable instructions that, when executed, cause the one or more processors to perform operations comprising: determining a location of an autonomous vehicle in an environment; receiving, based at least in part on the location being within a threshold distance of a destination, a parking space associated with a target pose indicating one or more of a target position or target orientation for the autonomous vehicle; generating a trajectory associated with navigating the autonomous vehicle to the parking space; determining, as a pose, one or more of a position or orientation of the autonomous vehicle within the environment; determining, based at least in part on the pose of the autonomous vehicle and the target pose of the parking space, a relative heading associated with the autonomous vehicle; determining a relative lateral offset associated with the autonomous vehicle and a relative longitudinal offset associated with the autonomous vehicle; accessing, based at least in part on the relative heading, a layer of a three-dimensional grid; determining, based at least in part on the relative lateral offset and the relative longitudinal offset, a region within the layer; receiving, based at least in part on the region, a cost associated with parking in the parking space; determining, based at least in part on the cost, to follow the trajectory; and controlling the autonomous vehicle based at least in part on the trajectory.

B: The system of paragraph A, wherein: the cost is one of a set of costs associated with a set of poses along the trajectory, and determining to follow the trajectory is based at least in part on a sum of the set of costs.

C: The system of paragraph A, wherein the cost is determined based at least in part on one or more of: a result indicating whether the autonomous vehicle is able to traverse to the region based at least in part on one or more of kinematics or dynamics associated with the autonomous vehicle; a lateral difference between the target pose and a final pose of the autonomous vehicle following a second trajectory from the pose to the target pose, or a heading difference between the final pose of the autonomous vehicle following the second trajectory and the target pose.

D: The system of paragraph A, wherein the trajectory is one of a plurality of trajectories, and controlling the autonomous vehicle in accordance with the trajectory comprises determining that a total cost for the trajectory is a lowest cost of a plurality of costs associated with the plurality of trajectories.

E: The system of paragraph A, wherein the three-dimensional grid is received from a remote system.

F: One or more non-transitory computer-readable media storing instructions executable by one or more processors, wherein the instructions, when executed, cause the one or more processors to perform operations comprising: determining, as a pose, one or more of a location or an orientation of a vehicle in an environment; receiving, based at least in part on the pose being within a threshold distance of a destination, a target pose associated with one or more of a target location or a target orientation for the vehicle; generating a trajectory associated with navigating the vehicle to the target pose; determining, based at least in part on the pose and the target pose, a relative state; determining, based at least in part on the relative state and a three-dimensional grid, a cost associated with controlling the vehicle from the pose to the target pose; and determining, based at least in part on the cost, to follow the trajectory.

G: The one or more non-transitory computer-readable media of paragraph F, wherein the trajectory is one of a plurality of trajectories, and controlling the vehicle in accordance with the trajectory comprises determining that a total cost for the trajectory is a lowest cost of a plurality of costs associated with the plurality of trajectories.

H: The one or more non-transitory computer-readable media of paragraph F, wherein the cost is determined based at least in part on one or more of: a result indicating whether the vehicle is capable of being controlled from the pose to the target pose based at least in part on one or more of dynamic or kinematic constraints associated with the vehicle, a lateral difference between a final pose of the vehicle following a second trajectory from the pose to the target pose and a target pose, or a heading difference between the final pose of the vehicle following the second trajectory and the target pose.

I: The one or more non-transitory computer-readable media of paragraph F, wherein: the cost is one of a set of costs associated with a set of poses along the trajectory, and determining to follow the trajectory is based at least in part on a sum of the set of costs.

J: The one or more non-transitory computer-readable media of paragraph I, wherein the sum of the set of costs is a weighted sum, and the weighted sum is based at least in part on how far in time the cost is from a current time.

K: The one or more non-transitory computer-readable media of paragraph F, wherein the relative state comprises a relative heading offset, a relative lateral offset, and a relative longitudinal offset, and wherein determining the cost is based at least in part on: accessing, based at least in part on the relative heading, a layer of the three-dimensional grid; determining, based at least in part on the relative lateral offset and the relative longitudinal offset, a region within the layer; and receiving, based at least in part on the region, the cost associated with parking in a parking space.

L: The one or more non-transitory computer-readable media of paragraph F, wherein the three-dimensional grid is received from a remote system.

M: The one or more non-transitory computer-readable media of paragraph F, further comprising: controlling the vehicle based at least in part on the trajectory.

N: A method comprising: determining, as a pose, one or more of a location or an orientation of a vehicle in an environment; receiving, based at least in part on the pose being within a threshold distance of a destination, a target pose associated with one or more of a target location or a target orientation for the vehicle; generating a trajectory associated with navigating the vehicle to the target pose; determining, based at least in part on the pose and the target pose, a relative state; determining, based at least in part on the relative state and a three-dimensional grid, a cost associated with controlling the vehicle from the pose to the target pose; and determining, based at least in part on the cost, to follow the trajectory.

O: The method of paragraph N, wherein the trajectory is one of a plurality of trajectories, and controlling the vehicle in accordance with the trajectory comprises determining that a total cost for the trajectory is a lowest cost of a plurality of costs associated with the plurality of trajectories.

P: The method of paragraph N, wherein the cost is determined based at least in part on one or more of: a result indicating whether the vehicle is capable of being controlled from the pose to the target pose based at least in part on one or more of dynamic or kinematic constraints associated with the vehicle, a lateral difference between a final pose of the vehicle following a second trajectory from the pose to the target pose and a target pose, or a heading difference between the final pose of the vehicle following the second trajectory and the target pose.

Q: The method of paragraph N, wherein: the cost is one of a set of costs associated with a set of poses along the trajectory, and determining to follow the trajectory is based at least in part on a sum of the set of costs.

R: The method of paragraph Q, wherein the sum of the set of costs is a weighted sum, and the weighted sum is based at least in part on how far in time the cost is from a current time.

S: The method of paragraph N, wherein the relative state comprises a relative heading offset, a relative lateral offset, and a relative longitudinal offset, and wherein determining the cost is based at least in part on: accessing, based at least in part on the relative heading, a layer of the three-dimensional grid; determining, based at least in part on the relative lateral offset and the relative longitudinal offset, a region within the layer; and receiving, based at least in part on the region, the cost associated with parking in a parking space.

T: The method of paragraph N, wherein the three-dimensional grid is received from a remote system.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more non-transitory computer-readable media storing computer-executable instructions that, when executed, cause the one or more processors to perform operations comprising:
determining a location of an autonomous vehicle in an environment;
receiving, based at least in part on the location being within a threshold distance of a destination, a parking space associated with a target pose indicating one or more of a target position or target orientation for the autonomous vehicle;
generating a trajectory associated with navigating the autonomous vehicle to the parking space;
determining, as a pose, one or more of a position or orientation of the autonomous vehicle within the environment;
determining, based at least in part on the pose of the autonomous vehicle and the target pose of the parking space, a relative heading associated with the autonomous vehicle;
determining a relative lateral offset associated with the autonomous vehicle and a relative longitudinal offset associated with the autonomous vehicle;
accessing, based at least in part on the relative heading, a layer of a three-dimensional grid, the three-dimensional grid comprising a plurality of layers that are organized by relative heading angles;
determining, based at least in part on the relative lateral offset and the relative longitudinal offset, a region within the layer;
receiving, based at least in part on the region, a cost associated with parking in the parking space;
determining, based at least in part on the cost, to follow the trajectory; and
controlling the autonomous vehicle based at least in part on the trajectory.

2. The system of claim 1, wherein:
the cost is one of a set of costs associated with a set of poses along the trajectory, and
determining to follow the trajectory is based at least in part on a sum of the set of costs.

3. The system of claim 1, wherein the cost is determined based at least in part on one or more of:
a result indicating whether the autonomous vehicle is able to traverse to the region based at least in part on one or more of kinematics or dynamics associated with the autonomous vehicle;
a lateral difference between the target pose and a final pose of the autonomous vehicle following a second trajectory from the pose to the target pose, or
a heading difference between the final pose of the autonomous vehicle following the second trajectory and the target pose.

4. The system of claim 1, wherein the trajectory is one of a plurality of trajectories, and
controlling the autonomous vehicle in accordance with the trajectory comprises determining that a total cost for the trajectory is a lowest cost of a plurality of costs associated with the plurality of trajectories.

5. The system of claim 1, wherein the three-dimensional grid is received from a remote system.

6. One or more non transitory computer readable media storing instructions executable by one or more processors, wherein the instructions, when executed, cause the one or more processors to perform operations comprising:
determining, as a pose, one or more of a location or an orientation of a vehicle in an environment;
receiving, based at least in part on the pose being within a threshold distance of a destination, a target pose associated with one or more of a target location or a target orientation for the vehicle;
generating a trajectory associated with navigating the vehicle to the target pose;
determining, based at least in part on the pose and the target pose, a relative state;
determining, based at least in part on the relative state and a three-dimensional grid, a layer that is associated with the relative state, the three-dimensional grid comprising a plurality of layers that are organized by relative heading angles;
determining, based at least in part on the layer, a cost associated with controlling the vehicle from the pose to the target pose;
determining, based at least in part on the cost, to follow the trajectory; and
controlling the vehicle based at least in part on the trajectory.

7. The one or more non transitory computer readable media of claim 6, wherein the trajectory is one of a plurality of trajectories, and
controlling the vehicle in accordance with the trajectory comprises determining that a total cost for the trajectory is a lowest cost of a plurality of costs associated with the plurality of trajectories.

8. The one or more non transitory computer readable media of claim 6, wherein the cost is determined based at least in part on one or more of:
a result indicating whether the vehicle is capable of being controlled from the pose to the target pose based at least in part on one or more of dynamic or kinematic constraints associated with the vehicle,
a lateral difference between a final pose of the vehicle following a second trajectory from the pose to the target pose and a target pose, or
a heading difference between the final pose of the vehicle following the second trajectory and the target pose.

9. The one or more non transitory computer readable media of claim 6, wherein:
the cost is one of a set of costs associated with a set of poses along the trajectory, and
determining to follow the trajectory is based at least in part on a sum of the set of costs.

10. The one or more non transitory computer readable media of claim 9, wherein the sum of the set of costs is a weighted sum, and the weighted sum is based at least in part on how far in time the cost is from a current time.

11. The one or more non transitory computer readable media of claim 6, wherein the relative state comprises a relative heading offset, a relative lateral offset, and a relative longitudinal offset, and wherein determining the cost is based at least in part on:
accessing, based at least in part on the relative heading offset, the layer of the three-dimensional grid;
determining, based at least in part on the relative lateral offset and the relative longitudinal offset, a region within the layer; and
receiving, based at least in part on the region, the cost associated with parking in a parking space.

12. The one or more non transitory computer readable media of claim 6, wherein the three-dimensional grid is received from a remote system.

13. The one or more non transitory computer readable media of claim 6, wherein the layer is a first layer, wherein the three-dimensional grid includes a second layer, wherein the first layer and the second layer differ based at least in part on a predetermined relative heading.

14. A method comprising:
  determining, as a pose, one or more of a location or an orientation of a vehicle in an environment;
  receiving, based at least in part on the pose being within a threshold distance of a destination, a target pose associated with one or more of a target location or a target orientation for the vehicle;
  generating a trajectory associated with navigating the vehicle to the target pose;
  determining, based at least in part on the pose and the target pose, a relative state;
  determining, based at least in part on the relative state and a three-dimensional grid, a layer that is associated with the relative state, the three-dimensional grid comprising a plurality of layers that are organized by relative heading angles;
  determining, based at least in part on the layer, a cost associated with controlling the vehicle from the pose to the target pose;
  determining, based at least in part on the cost, to follow the trajectory; and
  controlling the vehicle based at least in part on the trajectory.

15. The method of claim 14, wherein the trajectory is one of a plurality of trajectories, and
  controlling the vehicle in accordance with the trajectory comprises determining that a total cost for the trajectory is a lowest cost of a plurality of costs associated with the plurality of trajectories.

16. The method of claim 14, wherein the cost is determined based at least in part on one or more of:
  a result indicating whether the vehicle is capable of being controlled from the pose to the target pose based at least in part on one or more of dynamic or kinematic constraints associated with the vehicle,
  a lateral difference between a final pose of the vehicle following a second trajectory from the pose to the target pose, or
  a heading difference between the final pose of the vehicle following the second trajectory and the target pose.

17. The method of claim 14, wherein:
  the cost is one of a set of costs associated with a set of poses along the trajectory, and
  determining to follow the trajectory is based at least in part on a sum of the set of costs.

18. The method of claim 17, wherein the sum of the set of costs is a weighted sum, and the weighted sum is based at least in part on how far in time the cost is from a current time.

19. The method of claim 14, wherein the relative state comprises a relative heading offset, a relative lateral offset, and a relative longitudinal offset, and wherein determining the cost is based at least in part on:
  accessing, based at least in part on the relative heading offset, the layer of the three-dimensional grid;
  determining, based at least in part on the relative lateral offset and the relative longitudinal offset, a region within the layer; and
  receiving, based at least in part on the region, the cost associated with parking in a parking space.

20. The method of claim 14, wherein the three-dimensional grid is received from a remote system.

* * * * *